United States Patent
Iida et al.

(10) Patent No.: US 11,707,068 B2
(45) Date of Patent: Jul. 25, 2023

(54) FUNGICIDE, PHOTO CATALYTIC COMPOSITE MATERIAL, ADSORBENT, AND DEPURATIVE

(71) Applicant: SONY CORPORATION, Tokyo (JP)

(72) Inventors: Hironori Iida, Kanagawa (JP); Shun Yamanoi, Kanagawa (JP); Machiko Minatoya, Tokyo (JP); Seiichiro Tabata, Kanagawa (JP); Shinichiro Yamada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/823,697

(22) Filed: Mar. 19, 2020

(65) Prior Publication Data
US 2020/0229441 A1 Jul. 23, 2020

Related U.S. Application Data

(62) Division of application No. 14/591,666, filed on Jan. 7, 2015, which is a division of application No. 13/053,558, filed on Mar. 22, 2011, now abandoned.

(30) Foreign Application Priority Data

Mar. 30, 2010 (JP) ................................ 2010-077883
Jan. 20, 2011 (JP) ................................ 2011-009456

(51) Int. Cl.
*A01N 59/16* (2006.01)
*B01J 21/06* (2006.01)
(Continued)

(52) U.S. Cl.
CPC ........ *A01N 59/16* (2013.01); *B01J 20/28057* (2013.01); *B01J 20/28069* (2013.01);
(Continued)

(58) Field of Classification Search
CPC .................. B01J 39/07; B01J 20/28057; B01J 20/28069; B01J 20/3204; B01J 20/3246;
(Continued)

(56) References Cited

U.S. PATENT DOCUMENTS

| 4,169,911 A | 10/1979 | Yoshida et al. |
| 2002/0006865 A1 | 1/2002 | Morikawa et al. |

(Continued)

FOREIGN PATENT DOCUMENTS

| CA | 2659765 A1 | 10/2008 |
| CN | 1494944 A | 5/2004 |

(Continued)

OTHER PUBLICATIONS

Non-Final Office Action for U.S. Appl. No. 14/591,666 dated Dec. 14, 2020.
(Continued)

*Primary Examiner* — James A Fiorito
(74) *Attorney, Agent, or Firm* — Chip Law Group

(57) ABSTRACT

Disclosed herein is a fungicide, including a porous carbon material and a silver member adhered to the porous carbon material, wherein a value of a specific surface area based on a nitrogen BET, namely Brunauer, Emmett, and Teller method is equal to or larger than 10 $m^2/g$, and a volume of a fine pore based on a BJH, namely Barrett, Joyner, and Halenda method and an MP, namely Micro Pore method is equal to or larger than 0.1 $cm^3/g$.

14 Claims, 10 Drawing Sheets

EXAMPLE 1-A

EXAMPLE 1-B

COMPARATIVE EXAMPLE 1

(51) Int. Cl.

| | | |
|---|---|---|
| B01J 21/18 | (2006.01) | |
| C02F 1/28 | (2023.01) | |
| B01J 20/28 | (2006.01) | |
| B01J 20/32 | (2006.01) | |
| B01J 35/10 | (2006.01) | |
| B01J 35/00 | (2006.01) | |
| B01J 23/745 | (2006.01) | |
| B01J 39/07 | (2017.01) | |
| B01J 23/89 | (2006.01) | |
| B01J 27/188 | (2006.01) | |
| B01J 39/02 | (2006.01) | |
| C02F 1/50 | (2023.01) | |

(52) U.S. Cl.
CPC ....... *B01J 20/3204* (2013.01); *B01J 20/3246* (2013.01); *B01J 21/063* (2013.01); *B01J 21/18* (2013.01); *B01J 23/745* (2013.01); *B01J 23/8993* (2013.01); *B01J 27/188* (2013.01); *B01J 35/002* (2013.01); *B01J 35/004* (2013.01); *B01J 35/108* (2013.01); *B01J 35/1023* (2013.01); *B01J 35/1028* (2013.01); *B01J 35/1038* (2013.01); *B01J 35/1042* (2013.01); *B01J 39/02* (2013.01); *B01J 39/07* (2017.01); *C02F 1/281* (2013.01); *C02F 1/285* (2013.01); *C02F 1/288* (2013.01); *C02F 1/505* (2013.01); *C02F 2305/10* (2013.01); *Y10T 428/249967* (2015.04)

(58) Field of Classification Search
CPC ........ B01J 21/063; B01J 21/18; B01J 23/745; B01J 23/8993; B01J 27/188; B01J 35/002; B01J 35/004; B01J 35/1023; B01J 35/1038; B01J 35/108; B01J 39/02; C02F 1/281; C02F 1/285; C02F 1/288; A01N 59/16

See application file for complete search history.

(56) References Cited

U.S. PATENT DOCUMENTS

| | | | |
|---|---|---|---|
| 2005/0263453 A1 | 12/2005 | Collias et al. | |
| 2006/0166811 A1 | 7/2006 | Huang et al. | |
| 2007/0149397 A1 | 6/2007 | Tseng et al. | |
| 2007/0199890 A1 | 8/2007 | Trogolo | |
| 2008/0220162 A1 | 9/2008 | Ko et al. | |
| 2009/0111690 A1 | 4/2009 | Gadkarec et al. | |
| 2010/0167914 A1* | 7/2010 | Anderson | B01J 23/18 977/773 |
| 2010/0291167 A1 | 11/2010 | Iida et al. | |
| 2011/0244012 A1 | 10/2011 | Iida et al. | |
| 2012/0231250 A1 | 9/2012 | Minatoya et al. | |
| 2013/0310253 A1 | 11/2013 | Tabata et al. | |
| 2013/0315817 A1 | 11/2013 | Yamanoi et al. | |
| 2013/0324398 A1 | 12/2013 | Iida et al. | |
| 2014/0011666 A1 | 1/2014 | Yoshizaki et al. | |

FOREIGN PATENT DOCUMENTS

| | | | |
|---|---|---|---|
| CN | 1724146 A | | 1/2006 |
| CN | 1923333 A | | 3/2007 |
| CN | 101160169 A | | 4/2008 |
| CN | 1662210 A | | 8/2008 |
| CN | 101455975 A | * | 6/2009 |
| CN | 101455975 A | | 6/2009 |
| CN | 101541676 A | | 9/2009 |
| JP | 50-006718 A | | 1/1975 |
| JP | 52-038666 B2 | | 9/1977 |
| JP | 58-223439 A | | 12/1983 |
| JP | 59-151882 A | | 8/1984 |
| JP | 07-163640 A | | 6/1995 |
| JP | 09-075434 A | | 3/1997 |
| JP | 10-085759 A | | 4/1998 |
| JP | 11-278823 A | | 10/1999 |
| JP | 2000-211910 A | | 8/2000 |
| JP | 2002-095976 A | | 4/2002 |
| JP | 2006-055746 A | | 3/2006 |
| JP | 2006-167694 A | | 6/2006 |
| JP | 2007-501604 A | | 2/2007 |
| JP | 2007-203223 A | | 8/2007 |
| JP | 2008-189946 A | | 8/2008 |
| JP | 2008-273816 A | | 11/2008 |
| JP | 2009-072712 A | | 4/2009 |
| JP | 2009-101286 A | | 5/2009 |
| JP | 2010-000446 A | | 1/2010 |
| JP | 5471142 B2 | | 4/2014 |
| WO | 00/044033 A1 | | 7/2000 |

OTHER PUBLICATIONS

Kutics, K. et al., "Study of the adsorption characteristics and pore structure of activated carbons.", Surface technology, vol. 25, Issue 1, May 1985, pp. 87-96.

Office Action for CN Patent Application No. 201710330172.9, dated Sep. 4, 2019, 10 pages of Office Action and 12 pages of English Translation.

Owlad, et al., "Hexavalent chromium adsorption on impregnated palm shell activated carbon with polyethyleneimine", Bioresource Technology, vol. 101, Issue 14, Jul. 2010, pp. 5098-5103.

Unnithan, et al, "The Kinetics and Thermodynamics of Sorption of Chromium (VI) onto the Iron(III) Complex of Carboxylated Polyacrylamide-Grafted Sawdust", Industrial & Engineering Chemistry Research, vol. 40, No. 12, 2001, pp. 2693-2701.

Hu, et al., "Novel activation process for preparing highly microporous and mesoporous activated carbons", Elsevier Science Ltd., Carbon, vol. 39, Issue 6, May 2001, pp. 877-886.

Yin, et al., "Enhanced Adsorption of Metal Ions Onto Polyethyleneimine-Impregnated Palm Shell Activated Carbon: equilibrium Studies", Water Air Soil Pollution, vol. 192, Jul. 2008, pp. 337-348.

Bledzki, et al., "Barley husk and coconut shell reinforced polypropylene composites: The effect of fibre physical, chemical and surface properties", Composites Science and Technology, vol. 70, Issue 5, May 2010, pp. 840-846.

Office Action for JP Patent Application No. 2017-058571, dated May 29, 2018, 04 pages of Office Action and 04 pages of English Translation.

Final Office Action cited in U.S. Appl. No. 13/053,558 dated May 24, 2017, 17 pages.

Sudaryanto, et al., "High surface area activated carbon prepared from cassava peel by chemical activation.", Bioresource technology, vol. 97, Issue 5, 2006, pp. 734-739.

Office Action for CN Patent Application No. 201510409535.9, dated Jan. 5, 2017, 06 pages of Office Action and 08 pages of English Translation.

Office Action for JP Patent Application No. 2015-095600, dated Dec. 27, 2016, 04 pages.

Xiaoning, et al., "Functionalization of carbon nanobeads and their use as metal ion adsorbents." Carbon, vol. 41, Issue 15, 2003, pp. 2889-2896.

Office Action for JP Patent Application No. 2015-095600, dated Jul. 19, 2016, 9 pages.

Office Action for JP Patent Application No. 2015-095600, dated May 10, 2016, 07 pages.

Zhao, et al., "Antibacterial action of silver-doped activated carbon prepared by vacuum impregnation", Applied Surface Science, vol. 266, Feb. 1, 2013, pp. 67-72.

Kadirve, et al., "Removal of heavy metals from industrial wastewaters by adsorption onto activated carbon prepared from an agricultural solid waste." Bioresource technology, vol. 76, Issue 1, 2001, pp. 63-65.

Suzuki, et al., "Preparation and characterization of activated carbon from rice bran", Bioresource Technology, vol. 98, 2007, pp. 1985-1991.

(56) References Cited

OTHER PUBLICATIONS

Currie, et al., "Silica in Plants: Biological, Biochemical and Chemical Studies", Annals of Botany, vol. 100, No. 7, Dec. 2007, pp. 1383-1389.
SciFinder abstract of JP 58223439 A, orginal document published 1983.
Yin, et al., "Review of modifications of activated carbon for enhancing contaminant uptakes from aqueous solutions", Separation and Purification Technology, vol. 52, No. 3, Jan. 2007, pp. 403-415.
Currie, et al., "Silica in plants: biological, biochemical and chemical studies." Ann Bot., vol. 100, Issue 7, Dec. 2007, pp. 1383-1389.
Ortiz-Ibarra, et al., "Surface characterization of electrodeposited silver on activated carbon for bactericidal purposes.", Journal Colloid Interface Science, Oct. 15, 2007, vol. 314, Issue 2, Jul. 6, pp. 562-571.
Panacek, et al., "Silver colloid nanoparticles: synthesis, characterization, and their antibacterial activity", Journal of Physical Chemistry B, vol. 110, No. 33, Aug. 24, 2006, pp. 16248-16253.
Puma, et al., "Preparation of titanium dioxide photocatalyst loaded onto activated carbon support using chemical vapor deposition: A review paper", Journal of Hazardous Materials, Sep. 2008, vol. 157, Issues 2-3, pp. 209-219.
Suzuki, et al., "Preparation and characterization of activated carbon from rice bran." Bioresource Technology, vol. 98, Issue 10, Jul. 2007, pp. 1985-1991, Epub Oct. 6, 2006.
Office Action for JP Patent Application No. 2017-058571, dated Nov. 28, 2017, 05 pages of Office Action and 05 pages of English Translation.
Non-Final Office Action for U.S. Appl. No. 14/591,666, dated Dec. 19, 2019, 17 pages.
Final Office Action for U.S. Appl. No. 14/591,666, dated Apr. 8, 2019, 10 pages.
Non-Final Office Action for U.S. Appl. No. 14/591,666, dated Sep. 24, 2018, 21 pages.
Final Office Action for U.S. Appl. No. 14/591,666, dated Mar. 5, 2018, 12 pages.
Non-Final Office Action for U.S. Appl. No. 14/591,666, dated Dec. 14, 2017, 20 pages.
Final Office Action for U.S. Appl. No. 14/591,666, dated Aug. 18, 2017, 22 pages.
Non-Final Office Action for U.S. Appl. No. 14/591,666, dated Feb. 7, 2017, 17 pages.
Final Office Action for U.S. Appl. No. 14/591,666, dated Jun. 23, 2016, 13 pages.
Non-Final Office Action for U.S. Appl. No. 14/591,666, dated Dec. 11, 2015, 14 pages.
Advisory Action for U.S. Appl. No. 14/591,666, dated Sep. 6, 2016, 03 pages.
Office Action in U.S. Appl. No. 14/591,666, dated Feb. 7, 2017, pp. 22.
Chmiola, et al., "Effect of pore size and surface area of carbide derived carbons on specific capacitance", Journal of Power Sources, vol. 158, Issue 1, Jul. 14, 2006, pp. 765-772.
Wang, et al., "Biomorphic porous silicon carbide prepared from carbonized millet", Materials Science and Engineering: A, vol. 459, Issues 1-6, Jun. 2007, pp. 1-6.
R. Jugdaohsingh, "Silicon and Bone Health", J Nutr. Health Aging, 11(2), Europe PMC Funders Group Author Manuscript version, 2007, pp. 99-110.
Yushin et al., Chapter 8 "Carbided-Derived Carbon" from Nanomaterials Handbook, edited by Yury Gogotsi, CRC Press, 2006.
Park, et al., "Preparation and characterization of activated carbon fibers supported with silver metal for antibacterial behavior", Journal of Colloid and Interface, Science, vol. 261, Issue 2, May 15, 2003, pp. 238-243.
Non-Final Office Action for U.S. Appl. No. 13/053,558, dated Jan. 10, 2017,18 pages.
Final Office Action for U.S. Appl. No. 13/053,558, dated Jun. 23, 2016, 11 pages.

Non-Final Office Action for U.S. Appl. No. 13/053,558, dated Dec. 10, 2015, 18 pages.
Final Office Action for U.S. Appl. No. 13/053,558, dated Aug. 11, 2015, 14 pages.
Non-Final Office Action for U.S. Appl. No. 13/053,558, dated Feb. 26, 2015, 22 pages.
Final Office Action for U.S. Appl. No. 13/053,558, dated May 13, 2014, 15 pages.
Final Office Action for U.S. Appl. No. 14/591,666 dated May 6, 2020.
Non-Final Office Action for U.S. Appl. No. 13/053,558, dated Jan. 29, 2014, 16 pages.
Final Office Action for U.S. Appl. No. 13/053,558, dated May 9, 2013, 8 pages.
Non-Final Office Action for U.S. Appl. No. 13/053,558, dated Jan. 7, 2013, 8 pages.
Advisory Action for U.S. Appl. No. 13/053,558, dated Jul. 18, 2014, 03 pages.
Final Office Action for U.S. Appl. No. 14/591,666 dated Apr. 20, 2021.
Shentu B, Zhu Q, Liu Q, Weng Z. Kinetics and equilibrium of cobalt ion adsorption on cross-linked polyethylenimine membrane. Journal of applied polymer science. Aug. 15, 2007;105(4):1964-7 (Year: 2007).
Solum MS, Pugmire RJ, Jagtoyen M, Derbyshire F. Evolution of carbon structure in chemically activated wood. Carbon. Jan. 1, 1995; 33(9):1247-54. (Year: 1995).
Office Action for U.S. Appl. No. 14/591,666, dated Oct. 13, 2021, 14 pages of Office Action.
Nies, et al., "Transition metal homeostasis", EcoSal Plus, Doi 10.1128/Ecosalplus.5.4.4.3, Oct. 1, 2009, 38 pages.
Vidic, et al., "Vapor-phase elemental mercury adsorption by activated carbon impregnated with chloride and chelating agents", Carbon 39, Jan. 1, 2001, pp. 3-14.
Park, et al., "High-performance titanium dioxide photocatalyst on ordered mesoporous carbon support", Chemical Physics Letters, vol. 456, Mar. 17, 2008, pp. 198-201.
Chen Xiaoyun, "Preparation and Characterization of Visible-light Response TiO2 and TiO2/Activated Carbon Composite Materials", Chinese Selected Doctoral Dissertations and Master's Theses Full-Text Databases Engineering Science and Technology, No. 3, Mar. 15, 2008, 07 pages.
Gan, et al., "Synthesis and Photocatalytic Activity of Fe-doped TiO2-Actiated Carbon Composite Materials Response to Visible Light", Journal of Tongji University, Apr. 15, 2008, pp. 538-542.
Chen Xi, "Preparation and Characterization of TiO2/Activated Carbon Composite Materials Obtained via Sol-Gel Method", Chinese Selected Doctoral Dissertations and Master's Theses Full-Text Databases, Engineering Science and Technology, Series I, Mar. 15, 2008, 07 pages.
Liu, et al., "Low-temperature preparation and microwave photocatalytic activity study of TiO2-mounted activated carbon", Journal of Hazardous Materials, May 2007, pp. 208-215.
Office Action for CN Patent Application No. 202010125981.8, dated Dec. 23, 2021, 10 pages of English Translation and 05 pages of Office Action.
Final Office Action issued in U.S. Appl. No. 16/823,697 dated Feb. 2, 2022.
Final Office Action for U.S. Appl. No. 14/591,666 dated Apr. 19, 2022.
Non-Final Office Action for U.S. Appl. No. 14/591,666 dated Oct. 18, 2022.
Final Office Action for U.S. Appl. No. 14/591,666 dated Feb. 1, 2023.
Bang et al., "Applications of Ultrasound to the Synthesis of Nanostructured Materials," Adv. Mater. 2010, 22, pp. 1039-1059.
Bang et al., "Porous Carbon Supports Prepared by Ultrasonic Spray Pyrolysis for Direct Methanol Fuel Cell Electrodes," J. Phys. Chem C 2007, 111, 10959-10964.

* cited by examiner

COMPARATIVE EXAMPLE 1

EXAMPLE 1-B

EXAMPLE 1-A

EXAMPLE 1-A

EXAMPLE 1-B

COMPARATIVE EXAMPLE 1

Ag
PDF#89-3722

FUNGICIDE, PHOTO CATALYTIC COMPOSITE MATERIAL, ADSORBENT, AND DEPURATIVE

CROSS REFERENCE TO RELATED APPLICATIONS

This application is a divisional of U.S. patent application Ser. No. 14/591,666, filed on Jan. 7, 2015, which is a divisional of U.S. patent application Ser. No. 13/053,558, titled "FUNGICIDE, PHOTO CATALYTIC COMPOSITE MATERIAL, ADSORBENT, AND DEPURATIVE," filed on Mar. 22, 2011, which claims the benefit of Japanese Patent Application 2011-009456, filed on Jan. 20, 2011, and Japanese Patent Application 2010-077883, filed on Mar. 30, 2010, each of which is hereby incorporated by reference in its entirety.

BACKGROUND OF THE INVENTION

Field of the Invention

The present invention relates to a fungicide which is made of a porous carbon material complex, a photo catalytic composite material, an adsorbent, and a depurative.

Description of the Related Art

A functional material in which a physical property and a physicochemical property such as a light absorption property, and an absorptive capacity for a specific substance are given to a porous material is an interesting material because the functional material has both a high specific surface area, and a property of matter which the functional material has. Here, alumina, carbon, silica or the like can be given as the porous material. In addition, fine particles or thin films made of metals such as Fe, Co, Ni, Au, Ag, Pt, or Cu, alloys thereof, oxides such as $Fe_2O_3$, $Fe_3O_4$, $TiO_2$ or $ZnO_2$, compounds such as CdS, CdSe, ZnS, $CaCO_3$ or $Ca(CH_3COO)_2$, or the like, or polymeric films or a monomolecular films containing therein many amino groups can be given as the functional material having the light absorption property, and the absorptive capacity for the specific substance.

For such a functional material, for example, applications to an absorbent and a catalyst, an electrode for an energy device and a sensing device are expected. This, for example, is described in Japanese Patent Laid-Open No. 2006-167694. In addition, although almost unutilized portions of plants such as a vegetable and a cereal are discarded, the effective utilization of these unutilized portions is strongly urged for the maintenance and the improvement of the global environment. A carbonization treatment is given as an example of the effective utilization of the unutilized portions of the plants. Also, an example in which a carbon material manufactured by subjecting such a plant-derived material to the carbonization treatment is used in a dye absorbent is known from a non-patent literary document of Dyes and Pigments, Vol. 66, 2005, pp. 123 to 128. In addition, a method of manufacturing a carbide having a deodorizing ability, an ion exchange capacity, and a catalytic capacity based on the plant material is well known from Japanese Patent Laid-Open No. 2000-211910.

In addition, a fungicide, for example, can be given as a usage of such a functional material. Components such as fatty acid and glycerin contained in sweat are decomposed and altered into a lower fatty acid and the like, thereby generating an armpit odor. Until now, a zeolite containing therein silver (Ag) has been offered commercially. The zeolite containing therein Ag is such that Ag ions supported by the zeolite contacts a normal inhavitant (such as *Staphylococcus epidermidis* or diphtheroid fungus) to impede the action of the fungus, thereby cutting out the source of aroma.

SUMMARY OF THE INVENTION

The odor eliminating for eliminating the aroma generated, and the sterilization of the fungus which decompose and alter the components of the sweat are important in order to prevent the armpit odor from being generated. However, it is difficult to say that the Ag containing zeolite described above has the sufficient property in terms of the odor eliminating and the sterilization. In addition, the functional material, having the light absorption property, in which a titanium oxide ($TiO_2$) is supported by the porous material involves such a problem that the functional material concerned hardly absorbs a light in a visible light region and thus does not show the high decomposition reaction. Or, the porous carbon material as the case may involve such a problem that the porous carbon material concerned hardly adsorbs the metal.

The present invention has been made in order to solve the problems described above, and it is therefore desirable to provide a fungicide which is made of a porous carbon material and which has excellent odor eliminating and sterilization effects, a photo catalytic composite material which absorbs a light in a visible light region and shows a decomposition reaction, an adsorbent which adsorbs a metal, and a depurative.

In order to attain the desire described above, according to an embodiment of the present invention, there is provided a fungicide including: a porous carbon material; and a silver member (silver material) adhered to the porous carbon material, in which a value of a specific surface area based on a nitrogen BET, namely Brunauer, Emmett, and Teller method is equal to or larger than 10 $m^2/g$, and a volume of a fine pore based on a BJH, namely Barrett, Joyner, and Halenda method and an MP, namely Micro Pore method is equal to or larger than 0.1 $cm^3/g$.

According to another embodiment of the present invention, there is provided a photo catalytic composite material including: a porous carbon material; and a photo catalytic material adhered to the porous carbon material, in which a value of a specific surface area based on a nitrogen BET method is equal to or larger than 10 $m^2/g$, and a volume of a fine pore based on a BJH method and an MP method is equal to or larger than 0.1 $cm^3/g$; and the photo catalytic material is composed of a titanium oxide doped either with a cation or with an anion.

According to still another embodiment of the present invention, there is provided an adsorbent or a depurative including: a porous carbon material; and an organic material adhered to the porous carbon material, in which a value of a specific surface area based on a nitrogen BET method is equal to or larger than 10 $m^2/g$, and a volume of a fine pore based on a BJH method and an MP method is equal to or larger than 0.1 $cm^3/g$; and the organic material adsorbs a metal.

The fungicide, the photo catalytic composite material, the adsorbent, and the depurative of the present invention will be generically hereinafter referred to as "a porous carbon material complex of the present invention" in some cases. In addition, the silver member, the photo catalytic material, and the organic material each of which is to be adhered to the porous carbon material will be generically hereinafter referred to as "a functional material" in some cases. In addition, the porous carbon material composing the fungicide, the photo catalytic composite material, the adsorbent, and the depurative of the embodiment of the present invention will be hereinafter referred to as "the porous carbon material in the embodiment of the present invention" in some cases.

In each of the fungicide, the photo catalytic composite material, the adsorbent, and the depurative of the embodiment of the present invention, the value of the specific surface area based on the nitrogen BET method is equal to or larger than 10 m²/g and a volume of a fine pore based on a BJH method and an MP method is equal to or larger than 0.1 cm³/g. These requirements can be attained by a porous carbon material. In addition, the functional material is adhered to such a porous carbon material, thereby making it possible to increase an amount of functional material adhered per unit weight of the porous carbon material. Also, it is possible to obtain the porous carbon material complex having the high property and the high functionality.

Also, in the fungicide of the embodiment of the present invention, the high adsorption property and the high sterilization can be obtained because the silver member is adhered to the porous carbon material. Thus, the fungicide can also be utilized as a deodorant product, a deodorizer, an antimicrobial agent or preserving agent. In addition, in the photo catalytic composite material of the embodiment of the present invention, the photo catalytic material is composed of the titanium oxide doped either with the cation or with the anion. Therefore, the photo catalytic composite material of the embodiment of the present invention can effectively absorb the visible light, and thus is given a charge separation property, a visible light absorption property, an ultraviolet ray absorption property, and a catalyst property. Thus, the photo catalytic composite material of the embodiment of the present invention can be applied as a harmful material decomposition agent, and a harmful material remover which can be semi-permanently used due to the photo catalytic effect. In addition, in each of the adsorbent and the depurative of the embodiment of the present invention, the metal (a metal atom or a metal ion) can be effectively adsorbed because the organic material is adhered (supported, adsorbed or bonded) to the porous carbon material.

Moreover, the porous carbon material of the embodiment of the present invention is regulated in its volume of the fine pore, and has a fine pore in a meso region (in the range of 2 to 50 nm) which cannot be realized in existing activated carbon in addition to the fine pore in a micro region (<2 nm) which the existing activated carbon has. Also, the fungicide of the embodiment of the present invention shows the high adsorption capacity for the molecules as the cause of the aroma due to such a fine pore size. In addition thereto, the funguses are adsorbed by a macro fine pore (>50 nm) having the porous carbon material and dispersed, thereby also suppressing the growth of the funguses. In addition, in the photo catalytic composite material of the embodiment of the present invention, the photo catalytic material can be very effectively adhered to the porous carbon material based on the fine pore size as described above, and thus the decomposition based on the photo catalytic action can be effectively caused. In addition, in each of the photo catalytic composite material, the adsorbent and the depurative of the embodiment of the present invention as the material for the environment depuration, it is expected that the fine pore size as described above effectively act on the adsorption of the harmful materials. At the same time, the photo catalytic material or the organic material can be very effectively adhered to the porous carbon material, and thus the decomposition and detoxification of the harmful materials can be effectively caused. In addition, the diffusion of the harmful materials in the inside of the porous carbon material is promoted, which results in that the decomposition can be more effectively caused, and the depuration of the water, and the depuration of the air can be very effectively carried out.

BRIEF DESCRIPTION OF THE DRAWINGS

FIG. 11A is a graph representing results of a decomposition test about micro cystine based on a specimen of Example 2-B and commercially available porous carbon, and FIG. 11B is a conceptual view explaining decomposition of micro cystine in the specimen of Example 2-B;

FIG. 12 is a view schematically showing a state in which polyethylene imine as an organic material is adhered to the porous carbon material in an adsorbent and a depurative of Example 3;

DETAILED DESCRIPTION OF THE PREFERRED EMBODIMENTS

Figure 1:
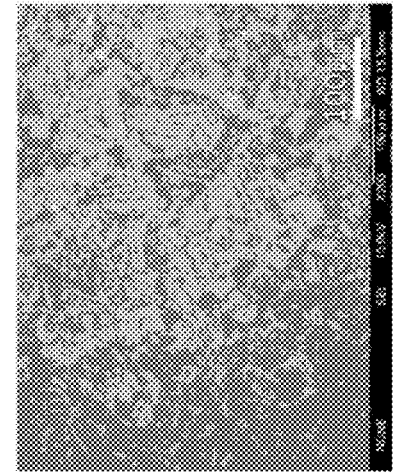
FIG. 1 is electron microscope images of fungicides of Example 1-A and Example 1-B, and a specimen of Comparative Example 1.
Figure 1:
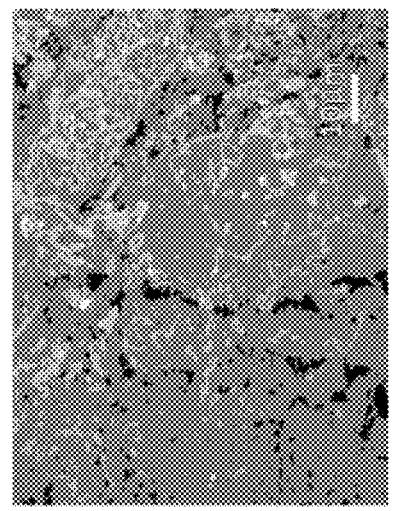
Figure 1:
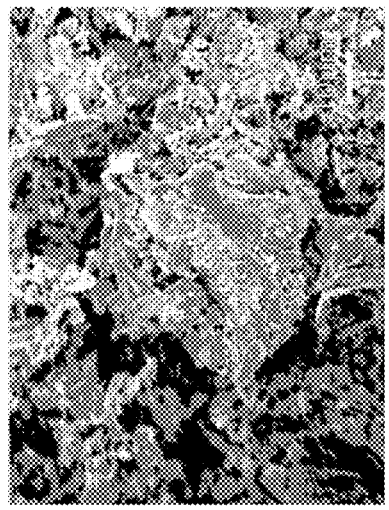
Figure 2A:
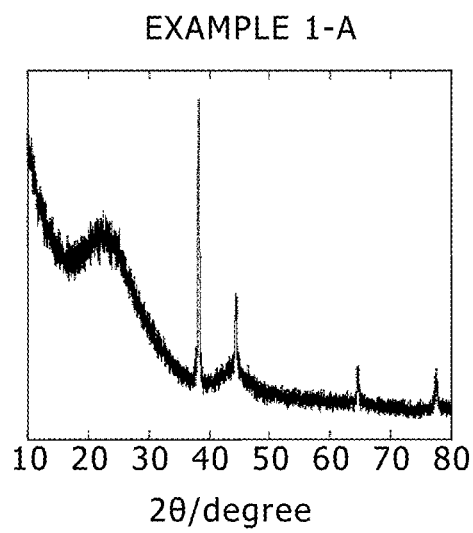
FIGS. 2A, 2B, 2C, and 2D are charts of X-ray diffraction results of the fungicides of Example 1-A and Example 1-B, and the specimen of Comparative Example 1 each obtained by using a powder X-ray diffractometry, and standard data of Ag in an X-ray diffraction analysis, respectively.
Figure 2B:
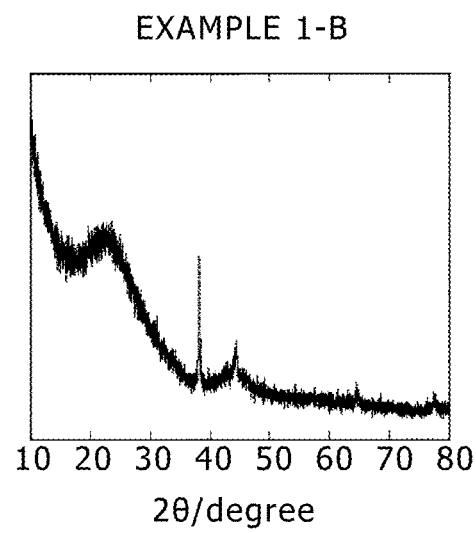
Figure 2C:
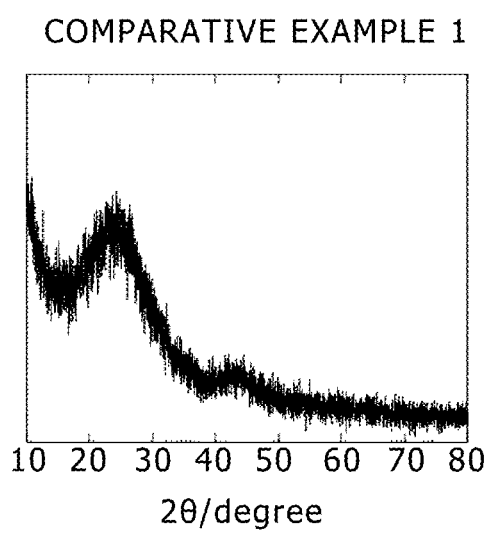
Figure 2D:
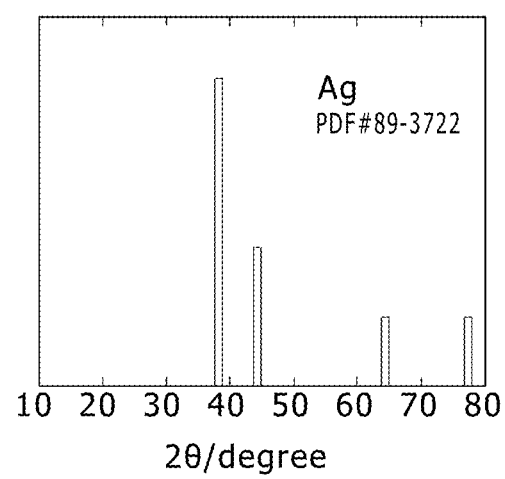

Examples of the present invention will be described in detail hereinafter with reference to the accompanying drawings. However, the present invention is by no means limited to Examples, and various numerical values and materials in Examples are merely exemplified. It is noted that the description will be given below in accordance with the following order.
1. Description about the Whole of Fungicide, Photo Catalytic Composite Material, Adsorbent, and Depurative of an Embodiment of the Present Invention
2. Example 1 (Fungicide of the Embodiment of the Present Invention)
3. Example 2 (Photo Catalytic Composite Material of the Embodiment of Present Invention)
4. Example 3 (Adsorbent and Depurative of the Embodiment of the Present Invention), and Others

[Description about the Whole of Fungicide, Photo Catalytic Composite Material, Adsorbent, and Depurative of an Embodiment of the Present Invention]

In a fungicide of an embodiment of the present invention, a silver member (silver material) can be composed of either an ion containing therein a silver ion; a particle containing therein silver, a silver alloy or a silver ion; or a thin film containing therein silver, the silver alloy or the silver ion. Here, an alloy of silver and ruthenium, an alloy of silver and rhodium, an alloy of silver and palladium, an alloy of silver and gold, an alloy of silver and platinum, an alloy of silver and cobalt, an alloy of silver and nickel, or an alloy of silver and copper can be exemplified as the silver alloy. Also, a form of silver nitrate, a form of silver chloride, or a form of silver sulfate can be exemplified as the silver ion. A method such as impregnation in a silver salt aqueous solution, or reduction and precipitation of silver by using a reducing agent can be exemplified as a method of adhering the silver member to a porous carbon material.

In addition, in a photo catalytic composite material of the embodiment of the present invention, a photo catalytic material can have a constitution that an energy of a light having a wavelength of 200 to 600 nm is absorbed. The photo catalytic material is composed of a titanium oxide doped either with a cation (positive ion) or with an anion (negative ion). Here, a chromium ion, an iron ion, a silver ion, a platinum ion, a copper ion, a tungsten ion, or, a cobalt ion or a nickel ion can be exemplified as a concrete example of the cation. Also, a nitrogen ion, a carbon ion, or a sulfur ion can be exemplified as a concrete example of the anion. A method in which crystal growth is carried out in a state in which a substance containing therein either a cation or an anion, and a raw material of a titanium oxide are mixed with each other, a method in which crystal growth is carried out from a substance in the form of gas containing therein either a cation or an anion, and a raw material of a titanium oxide in the form of gas, or a method in which after completion of synthesis of a titanium oxide, either a cation or an anion is supported on a surface of the titanium oxide can be exemplified as a method of doping the titanium oxide with either the cation or the anion. Adhesion in a state of a fine particle, or adhesion in a state of a thin film can be exemplified as a form of the adhesion of the titanium oxide to the porous carbon material. It is noted that a zinc oxide (ZnO) can also be used instead of using the titanium oxide.

A depurative can be obtained from the photo catalytic composite material of the embodiment of the present invention. For decomposition and removal of harmful substances, a visible light has to be radiated to the photo catalytic composite material of the embodiment of the present invention. Harmful substances each existing either in water or in air can be given as the harmful substances. Specifically, it is possible to exemplify a micro-cystine class or substances as sources of various kinds of virus or allergy. The depurative functions either as a depurative for water, or as a depurative for air, and thus, for example, can be applied as a filter of an air purification apparatus. Use in a sheet-like form, use in a state of being filled either in a column or in a cartridge, use in a state of being formed into a desired shape by using a binder or the like, or use in a powder form can be exemplified as a use form of the photo catalytic composite material (depurative) of the embodiment of the present invention. In addition, when the photo catalytic composite material is used as a depurative or an adsorbent dispersed in a solution, the photo catalytic composite material can be used by subjecting a surface thereof either to a hydrocolloid treatment or to a hydrophobic treatment.

In the adsorbent or the depurative of the embodiment of the present invention, an organic material having at least one kind of group selected from the group consisting of a phenol group, a carboxyl group, an amino group, a thiol group, a ketone group, a phosphoric acid group, an alkyl group, an ether group, and a thionyl group can be given as the organic material. Specifically, for example, polyethyleneimine can be given as the organic material. In addition, chromium, mercury, arsenic, lead, cadmium, tin, copper, zinc, lithium, beryllium, boron, titanium, vanadium, manganese, cobalt, nickel, gallium, germanium, selenium, rubidium, strontium, zirconium, niobium, molybdenum, palladium, indium, antimony, tellurium, cesium, barium, hafnium, tantalum, tungsten, rhenium, platinum, thallium, bismuth, scandium, yttrium, lanthanum, cerium, praseodymium, neodymium, promethium, samarium, europium, gadolinium, terbium, dysprosium, holmium, erbium, thulium, ytterbium, or lutetium can be given as the metal (including a metal atom and a metal ion). A method of forming C—C bond, C—N bond, CO bond or the like between the porous carbon material and the organic molecule, a method of coating $SiO_2$ and bonding the organic material to the porous carbon material by silane coupling, or a mixing and stirring method, for example, can be exemplified as the method of adhering (including the concept such as support, adsorption, bonding and surface modification) the organic material to the porous carbon material. The adhesion in a layer-like form, or the adhesion in an island-like form can be exemplified as a form of the adhesion of the organic material to the porous carbon material. It is noted that each of the adsorbent and the depurative of the embodiment of the present invention, for example, can enhance the negative ion exchange capacity or the positive ion exchange capacity, or can adsorb the metals (such as the metal atom and the metal ion) having various kinds of forms by changing a metal coordination or the like. In addition, each of the adsorbent and the depurative of the embodiment of the present invention can enhance the dispersibility either to a solvent or to the base.

Here, each of the adsorbent and the depurative of the embodiment of the present invention, for example, functions as a depurative for water and, for example, can also be applied to a filter. Also, the use in the sheet-like form, the use in the state of being filled either in the column or in the cartridge, the use in the state of being formed into the desired shape by using the binder or the like, or the use in the powder form can be exemplified as the use form. In addition, each of the adsorbent and the depurative the embodiment of the present invention can also absorb the metal contained in the gas such as smoke.

When the plant-derived material containing therein silicon (Si) is used as the raw material of the porous carbon material in the present invention, specifically, although a limitation is by no means carried out, preferably, the porous carbon material has the plant-derived material in which a content rate of silicon (Si) is equal to or larger than 5 wt % as the raw material. In this case, the content rate of silicon (Si) is equal to or smaller than 5 wt %, preferably is equal to or smaller than 3 wt %, and more preferably is equal to or smaller than 1 wt %.

For example, after the plant-derived material is carbonized at 400 to 1,400° C., the resulting material is treated by using either an acid or an alkali, thereby obtaining the porous carbon material. After that, the functional material is adhered to the resulting porous material, thereby making it possible to manufacture the porous carbon material complex of the embodiment of the present invention. In a method of manufacturing such a porous carbon material in the embodiment of the present invention (hereinafter simply referred to as "a method of manufacturing the porous carbon material" in some cases), a material which is obtained by carbonizing the plant-derived material at 400 to 1,400° C. before being treated by either using an acid or using an alkali is referred to either as "a porous carbon material precursor" or as "a carbonaceous material."

In the method of manufacturing the porous carbon material, after completion of the treatment either using the acid or using the alkali, a process for carrying out an activation treatment before the functional material is adhered to the porous carbon material can be contained, or the treatment either using the acid or using the alkali may be carried out after the activation treatment is carried out for the porous carbon material. In addition, in the method of manufacturing the porous carbon material including such a preferable form, although depending on the plant-derived material used, before the plant-derived material is carbonized, the plant-derived material may be subjected to the heat treatment (preliminary carbonizing treatment) at the lower temperature (for example, in the range of 400 to 700° C.) than that for the carbonization in a state in which oxygen is cut off. As a result, a tar component which will be generated in a process of carbonization can be extracted. As a result, the tar component which will be generated in the process of the carbonization can be either reduced or removed away. It is noted that, for example, an atmosphere of inactive gas such as a nitrogen gas or argon gas is prepared, or a vacuum atmosphere is prepared, or the plant-derived material is set in a sort of escalloped state, thereby making it possible to attain the state in which oxygen is cut off. In addition, in the method of manufacturing the porous carbon material, although depending on the plant-derived material used, for the purpose of reducing a mineral component and water contained in the plant-derived material, and for the purpose of preventing off-flavor from being generated in the process for the carbonization, the plant-derived material may be dipped in alcohol (such as methyl alcohol, ethyl alcohol or isopropyl alcohol). It is noted that in the method of manufacturing the porous carbon material, after that, the preliminary carbonizing treatment may be carried out. A plant which generates a large amount of wood vinegar (such as tar or light oil content), for example, can be given as the material which is preferably subjected to the heat treatment in the inactive gas. In addition, a seaweed which contains therein a large amount of iodine or various minerals, for example, can be given as the material which is preferably subjected to the pretreatment using the alcohol.

In the method of manufacturing the porous carbon material, the plant-derived material is carbonized at 400 to 1,400° C. Here, the carbonization generally means that the organic material (the porous carbon material in the embodiment of the present invention) is subjected to the heat treatment to be transformed into the carbonaceous material (for example, refer to JIS M0104-1984). It is noted that an atmosphere in which oxygen is cut off can be given as the atmosphere for the carbonization. Specifically, it is possible to give the vacuum atmosphere, the atmosphere of the inactive gas such as nitrogen gas or argon gas, or the atmosphere in which the plant-derived material is made to undergo the sort of escalloped state. Although not limited especially, 1° C./minute or more, preferably, 3° C./minute or more, or more preferably, 5° C./minute or more can be given as a rate of temperature rise in such an atmosphere until the carbonization temperature is reached. In addition, although 10 hours, preferably 7 hours, and more preferably 5 hours can be given as an upper limit of the carbonization time, the present invention is by no means limited thereto. Also, a lower limit of the carbonization time has to be set as a time for which the plant-derived material is reliably carbonized. In addition, the plant-derived material may be crushed to pieces each having a desired particle size as may be necessary, or may be classified. The plant-derived material may be previously cleaned. Or, the resulting porous carbon material precursor or porous carbon material may be crushed to pieces each having a desired particle size as may be necessary, or may be classified. Or, the porous carbon material after completion of the activation treatment may be crushed to pieces each having a desired particle size as may be necessary, or may be classified. In addition, a sterilization treatment may be carried out for the porous carbon material which is finally obtained. There is no limit to a type, a constitution and a construction of a furnace which is used for the carbonization. That is to say, a continuous furnace can be used, or a batch furnace can also be used.

In the method of manufacturing the porous carbon material, as previously stated, when the plant-derived material is subjected to the activation treatment, it is possible to increase the number of micro-fine pores (which will be described later) each having a pore diameter smaller than 2 nm. A gas activation method or a drug activation method can be given as a method for the activation treatment. Here, the gas activation method means a method in which oxygen, steam, carbon dioxide gas, air or the like is used as an activator, and the porous carbon material is heated at 700 to 1,400° C., preferably at 700 to 1,000° C., and more preferably at 800 to 1,000° C.

for several tens of minutes to several hours, whereby a fine structure is developed by volatile components and carbon molecules in the porous carbon material. It is noted that more specifically, the heating temperature may be suitably selected in accordance with a kind of plant-derived material, a kind of gas, a concentration of gas, and the like. The drug activation method means a method in which the plant-derived material is activated by using zinc chloride, iron chloride, calcium phosphate, calcium hydroxide, magnesium carbonate, kalium carbonate, a sulfuric acid, or the like instead of using oxygen or steam used in the gas activation method, is rinsed by using a hydrochloric acid, is adjusted in pH by using an alkaline aqueous solution, and is then dried.

In the method of manufacturing the porous carbon material, the silicon components in the plant-derived material after completion of the carbonization are removed away by carrying out the treatment using either the acid or the alkali. Here, silicon oxides such as a silicon dioxide, oxidized silicon, and a silicon oxide salt can be given as the silicon components. The silicon components in the plant-derived material after completion of the carbonization are removed away in the manner as described above, whereby it is possible to obtain the porous carbon material having a high specific surface area, and it is also possible to increase an amount of functional material adhered per unit weight of the porous carbon material. The silicon components contained in the plant-derived material after completion of the carbonization may be removed away based on a dry etching method as the case may be.

That is to say, in the preferable form of the porous carbon material in the embodiment of the present invention, the plant-derived material containing therein silicon (Si) is used as the raw material. However, when the plant-derived material is transformed either into a porous carbon material precursor or into a carbonaceous material, the plant-derived material is carbonized at a high temperature (for example, in the range of 400 to 1,400° C.), whereby silicon contained in the plant-derived material does not turn into a silicon carbide (SiC), but exists as silicon components (silicon oxides) such as a silicon dioxide ($SiO_x$), a silicon oxide and a silicon oxide salt. For this reason, a treatment is carried out in a next process by either using an acid or using an alkali (base), thereby removing away the silicon components (silicon oxides) such as the silicon dioxide, the silicon oxide and the silicon oxide salt. As a result, it is possible to obtain a value of a large specific surface area based on a nitrogen BET method.

In addition, in the preferable form of the porous carbon material in the embodiment of the present invention, the porous carbon material in the embodiment of the present invention is a natural product-derived environment conciliatory material. A fine structure of the porous carbon material is obtained by treating the silicon components (silicon oxides) previously contained in the raw material as the plant-derived material by either using the acid or using the alkali to remove away the silicon components. Therefore, an arrangement of the fine pores maintains the biological body regularity which the plant has.

As described above, in the porous carbon material, the plant-derived material can be used as the raw material. Here, a rice hull or a straw of rice (rice plant), barley, wheat, rye, a barnyard grass, millet or the like, a coffee bean, a tea leave (such as a leave of a green tea or a red tea), a sugar cane class (more specifically, a cone trash of the sugar cane class), a corn class (more specifically, a core of the corn class), or a coat of a fruit (such as a coat of an orange or a banana), or a reed or a stalk brown seaweed can be given as the plant-derived material. However, the present invention is by no means limited thereto. Or, for example, it is possible to give a vascular plant, a pteridophyte, or a bryophyte which is vegetated on the land, an alga or a sea alga. It is noted that these materials also may be used either in the form of singularity or in the form of multiple kinds of materials mixed with one another as the raw material. In addition, a shape and a form of the plant-derived material are especially by no means limited. For example, the rice hull or straw itself may be used, or a product obtained by subjecting the plant-derived material to a drying treatment may also be used. In addition, it is possible to use a product which is subjected to various kinds of treatments such as a formentation treatment, a roasting treatment and an extraction treatment in processing for food and drink such as beer, and wines and spirits. In particular, it is preferable to use the straw and the rice hull after completion of the processing such as the thrashing from a viewpoint of the recycling of the industrial waste. These straw and rice hull after completion of the processing, for example, are available in large numbers and readily from an agricultural cooperative, an alcoholic drinks manufacturing company, a food company, or a food-processing company.

In the porous carbon material complex of the embodiment of the present invention, although depending on the kind, constitution, structure and form of the functional material, as described above, a state in which the functional material is adhered as the ions, a state in which the functional material is adhered as the fine particle to the surface (including the inside of the fine pore) of the porous carbon material, a state in which the functional material is adhered as the fine particle to the surface (including the inside of the fine pore) of the porous carbon material, a state in which the functional material is adhered in the thin film form, a state in which the functional material is adhered in the sea/island form (when the surface of the porous carbon material is regarded as "the sea," the functional material corresponds to "the island") can be given as the form of the adhesion of the functional material to the porous carbon material. It is noted that the adhesion means the phenomenon of the adhesion between different kinds of materials. Although depending on the functional material, a method in which the porous carbon material is dipped in the solution containing therein the functional material or a precursor thereof, thereby precipitating the functional material on the surface of the porous carbon material, a method in which the functional material is precipitated on the surface of the porous carbon material by using a nonelectrolytic plating method (chemical plating method) or a chemical reduction reaction, or a method in which the porous carbon material is dipped in the solution containing therein the precursor of the functional material, and the heat treatment is carried out, thereby precipitating the functional material on the surface of the porous carbon material can be given as the general method of adhering the functional material to the porous carbon material. Or, a method in which the porous carbon material is dipped in the solution containing therein the precursor of the functional material, and an ultrasonic radiation treatment is carried out, thereby precipitating the functional material on the surface of the porous carbon material, or a method in which the porous carbon material is dipped in the solution containing therein the precursor of the functional material, and a sol/gel reaction is carried out, thereby precipitating the functional material on the surface of the porous carbon material can be given as the general method of adhering the functional material to the porous carbon material.

A nonmetal element such as magnesium (Mg), kalium (K), calcium (Ca), phosphorus (P) or sulfur (S), or a metal element such as a transition element may be contained in the porous carbon material in the embodiment of the present invention. As the content rate of magnesium (Mg), 0.01 wt % or more and 3 wt % or less can be given, 0.01 wt % or more and 3 wt % or less can be given as the content rate of kalium (K), 0.05 wt % or more and 3 wt % or less can be given as the content rate of calcium (Ca), 0.01 wt % or more and 3 wt % or less can be given as the content rate of phosphorus (P), and 0.01 wt % or more and 3 wt % or less can be given as the content rate of sulfur (S). It is noted that although the content rates of these elements differ depending on the use application of the porous carbon material complex of the embodiment of the present invention, preferably, the content rates of these elements are each less from a viewpoint of an increase in value of the specific surface area. It goes without saying that the porous carbon material may contain any of elements other than the elements described above, and the ranges of the content rates of the various kinds of elements described above can change depending on the use application of the porous carbon material complex of the embodiment of the present invention.

In the present invention, the analyses about the various kinds of elements can be carried out in accordance with an energy dispersion method (EDS) by using an energy dispersive X-ray analyzer (such as JED-2200F made by JAPAN ELECTRON OPTICS LABORATORY CO., LTD.). Here, a measurement condition, for example, has to be set in such a way that a scanning voltage is 15 kV, and a radiation current is 10 μA.

The porous carbon material complex of the embodiment of the present invention has many fine pores. "A meso fine pore" having a pore diameter of 2 to 50 nm, and "a micro fine pore" having a pore diameter smaller than 2 nm are contained as the fine pore in the porous carbon material complex. Specifically, the porous carbon material complex, for example, contains therein many fine pores each having the pore diameter of 20 nm or less as the meso fine pores, especially, contains therein many fine pores each having the pore diameter of 10 nm or less. In addition, the porous carbon material complex, for example, contains therein many fine pores each having the pore diameter of about 1.9 nm, many fine pores each having the pore diameter of about 1.5 nm, and many fine pores each having the pore diameter of 0.8 to 1 nm as the micro fine pores. Although in the porous carbon material complex of the present invention, a volume of the fine pore based on both the BJH method and the MP method is equal to or larger than 0.1 cm$^3$/g, more preferably, equal to or larger than 0.3 cm$^3$/g. Or, the volume of the fine pore based on the BJH method is preferably equal to or larger than 0.1 cm$^3$/g, more preferably is equal to or larger than 0.3 cm$^3$/g, and much more preferably is equal to or larger than 0.5 cm$^3$/g.

In the porous carbon material complex of the embodiment of the present invention, for the purpose of obtaining the more excellent functionality, it is desirable that the value of the specific surface area based on the nitrogen BET method (hereinafter referred simply to as "the value of the specific surface area" in some cases) is preferably equal to or larger than 50 m$^2$/g, is more preferably equal to or larger than 100 m$^2$/g, and is much more preferably equal to or larger than 400 m$^2$/g.

The nitrogen BET method means a method in which an adsorption isotherm is measured by adsorbing and desorbing nitrogen molecules as adsorbed molecules to and from the adsorbent (the porous carbon material complex in this case), and data obtained through the measurement is analyzed based on a BET expression expressed by Expression (1). Thus, the specific surface area, the fine pore volume and the like can be calculated based on the nitrogen BET method. Specifically, when the value of the specific surface area is calculated by using the nitrogen BET method, firstly, the adsorption isotherm is obtained by adsorbing and desorbing the nitrogen molecules as adsorbed molecules to and from the adsorbent (porous carbon material complex). Also, $[p/\{V_a(p_0-p)\}]$ is calculated from the resulting adsorption isotherm based either on Expression (1) or on Expression (1') into which Expression (1) is transformed, and data on $[p/\{V_a(p_0-p)\}]$ is then plotted against an equilibrium relative pressure $(p/p_0)$. Also, the line obtained based on the data plotting is regarded as a straight line, and a slop s $(=[(C-1)/(C \cdot V_m)]$ and an intercept i $(=[1/(C \cdot V_m)]$ are calculated based on a least-squares method. Also, $V_m$ and C are calculated from the slope, s, and intercept, i, thus obtained based on Expression (2-1) and Expression (2-2). In addition, a specific surface area, $a_{sBET}$, is calculated from $V_m$ based on Expression (3). This calculation, for example, is described in a manual of BELSORP-mini and BELSORP analysis software made by BEL JAPAN, INC., pp. 62 to 66. It should be noted that the nitrogen BET method is a measurement method conforming to JIS R 1626-1996 "A method of measuring a specific surface area based on a gas adsorption BET method for fine ceramics powder."

$$V_a = (V_m \cdot Cp)/[(po-p)\{1+(C-1)(p/p_0)\}] \quad (1)$$

$$[p/\{V_a(p_0-p)\}] = [(C-1)/(C \cdot V_m)](p/p_0) + [1/(C \cdot V_m)] \quad (1')$$

$$V_m = 1/(s+i) \quad (2-1)$$

$$C = (s/i)+1 \quad (2-2)$$

$$a_{sBET} = (V_m \cdot L \cdot \sigma)/22414 \quad (3)$$

where $V_a$ is an amount of adsorption, $V_m$ is an amount of adsorption of a single molecule layer, p is a pressure in a phase of equilibrium of nitrogen, $p_0$ is a saturated vapor pressure, L is an Avogadro's number, and σ is an adsorption cross section of nitrogen.

When the fine pore volume, $V_p$, is calculated based on the nitrogen BET method, for example, the adsorption data on the adsorption isotherm thus obtained is linearly interpolated, thereby obtaining the amount, V, of adsorption at the relative pressure set in the fine pore volume calculation relative pressure. The fine pore volume $V_p$ can be calculated from the amount, V, of adsorption based on Expression (4). This calculation, for example, is described in the manual of BELSORP-mini and BELSORP analysis software made by BEL JAPAN, INC., pp. 62 to 66. It is noted that the fine pore volume based on the nitrogen BET method will be referred hereinafter simply to as "a fine pore volume" in some cases.

$$V_p = (V/22414) \times (M_g/\rho_g) \quad (4)$$

where V is an amount of adsorption at the relative pressure, $M_g$ is molecular weight of nitrogen, and $\rho_g$ is a density of nitrogen.

The pore diameter of the meso fine pore, for example, can be calculated in the form of a distribution of the fine pores from a change ratio of the fine pore volume to the pore diameter based on the BJH method. The BJH method is a method which is widely used as a fine pore distribution analyzing method. When the fine pore distribution analysis is carried out based on the BJH method, firstly, the adsorption isotherm is obtained by adsorbing and desorbing the nitrogen molecules as adsorbed molecules to and from the adsorbent (porous carbon material complex). Also, a thickness of the adsorption layer when the adsorbed molecules are adsorbed and desorbed step by step from a state in which the fine pores are filled with the adsorbed molecules (for example, the nitrogen molecules), and an inner diameter of each of the pores (which is double the core radius) which are generated in this case are obtained based on the resulting adsorption isotherm, a fine pore radius, $r_p$, is calculated based on Expression (5), and a fine pore volume is calculated based on Expression (6). Also, the change ratio $(dV_p/dr_p)$ of the fine pore volume to the fine pore diameter, $2r_p$, is plotted from both the fine pore radius and the fine pore volume, thereby obtaining a fine pore distribution curve. This calculation, for example, is described in the manual of BELSORP-mini and BELSORP analysis software made by BEL JAPAN, INC., pp. 85 to 88.

$$r_p = t + r_k \quad (5)$$

$$V_{pn} = R_n \cdot dV_n - R_n \cdot dt_n \cdot c \cdot \Sigma A_{pj} \quad (6)$$

$$R_n = r_{pn}^2 / (r_{kn-1} + dt_n)^2 \quad (7)$$

where $r_p$ is the fine pore radius, and $r_k$ is the inner radius of the core (inner diameter/2) when the adsorption layer having a thickness, t, is adsorbed to an inner wall of the fine pore having the fine pore radius, $r_p$, at the pressure set therein, $V_{pn}$ is the fine pore volume when the n-th round of adsorption and desorption of the nitrogen molecules are generated, and $dV_n$ is a change rate at this time. Further, $dt_n$ is a change rate of the thickness, $t_n$, of the adsorption layer when the n-th round of adsorption and desorption of the nitrogen molecules are generated, $r_{kn}$ is a core radius at this time, c is a fixed value, $r_{pn}$ is the fine pore radius when the n-th round of adsorption and desorption of the nitrogen molecules is generated, and $\Sigma A_{pj}$ represents an integrated value of an area of a wall surface of the fine pore from j=1 to j=n−1.

The pore diameter of the micro fine pore, for example, can be calculated in the form of a distribution of the fine pores from the change ratio of the fine pore volume to the pore diameter based on the MP method. When the fine pore distribution analysis is carried out based on the MP method, firstly, the adsorption isotherm is obtained by adsorbing the nitrogen molecules to the adsorbent (porous carbon material complex). Also, the adsorption isotherm is transformed into the fine pore volume relative to the thickness, t, of the adsorption layer (is t-plotted). Also, the fine pore distribution curve can be obtained based on a curvature (an amount of change in fine pore volume relative to an amount of change in thickness, t, of the adsorption layer). This calculation, for example, is described in the manual of BELSORP-mini and BELSORP analysis software made by BEL JAPAN, INC., pp. 72 and 73, and p. 82.

In the Non Localized Density Functional Theory method (NLDFT method) regulated in JIS Z8831-2: 2010 "A fine pore distribution and fine pore characteristics of powder (solid)—the second part: A method of measuring a meso fine pore and a macro fine pore based on gas adsorption," and JIS Z8831-3: 2010 "A fine pore diameter distribution and fine pore characteristics of powder (solid)—the third part: A method of measuring a micro fine pore based on gas adsorption," software that comes with an automatic specific surface area/fine pore distribution measuring apparatus "BELSORP-MAX" manufactured by BEL JAPAN, INC. is used as analysis software. A model is formed so as to have a cylindrical shape and carbon black (CB) is assumed as the prerequisite, and a distribution function of a fine pore distribution parameter is set as "no-assumption." The smoothing is carried out ten times for the resulting distribution data.

Here, when the fungicide of the embodiment of the present invention is regulated based on the non localized density functional theory method, the fungicide of the embodiment of the present invention for attaining the desire described above includes:

(A) a porous carbon material; and
(B) a silver member (silver material) adhered to the porous carbon material.

In addition, when the photo catalytic composite material of the embodiment of the present invention is regulated based on the non localized density functional theory method, the photo catalytic composite material of the embodiment of the present invention for attaining the desire described above includes:

(A) a porous carbon material; and
(B) a photo catalytic material adhered to the porous carbon material, and the photo catalytic material is composed of a titanium oxide doped either with a cation or with an anion.

When the adsorbent or the depurative of the embodiment of the present invention is regulated based on the non localized density functional theory method, the adsorbent or the depurative of the embodiment of the present invention for attaining the desire described above includes:

(A) a porous carbon material; and
(B) an organic material adhered to the porous carbon material, and the organic material adsorbs a metal.

Also, in the fungicide of the embodiment of the present invention, the photo catalytic composite material of the embodiment of the present invention, and the adsorbent or the depurative of the embodiment of the present invention, the value of the specific surface area based on the nitrogen BET method is equal to or larger than 10 m²/g, and the total of the volumes of the fine pores having the diameters in the range of $1 \times 10^{-9}$ to $5 \times 10^{-7}$ m obtained based on the non localized density functional theory method is equal to or larger than 0.1 cm³/g. Or, the value of the specific surface area based on the nitrogen BET method is equal to or larger than 10 m²/g, and a rate of the total of the volumes of the fine pores having at least one peak in the range of 3 to 20 nm, and having the fine pore diameters in the range of 3 to 20 nm in the fine pore diameter distribution obtained based on the non localized density functional theory method is equal to or larger than 0.2 of the total of the volumes of all the fine pores.

The porous carbon material precursor is treated by using either the acid or the alkali. In this case, a method of dipping the porous carbon material precursor in an aqueous solution of either the acid or the alkali, or a method of causing the porous carbon material precursor and the acid or the alkali to react with each other in a gas phase, for example, can be given as the concrete treatment method. More specifically, when the porous carbon material precursor is treated by using the acid, a fluorine compound, showing an acidic property, such as hydrogen fluoride, a hydrofluoric acid, ammonium fluoride, calcium fluoride or sodium fluoride can be given as the acid. When the fluorine compound is used, fluorine elements have to be four times in its amount as large as the silicon elements in the silicon components contained in the porous carbon material precursor. Thus, preferably, the concentration of the fluorine compound aqueous solution is equal to or larger than 10 wt %. When the silicon components (such as the silicon dioxide) contained in the porous carbon material precursor are removed away by using the hydrofluoric acid, the silicon dioxide reacts with the hydrofluoric acid as shown either in Chemical Formula (A) or in Chemical Formula (B) to be removed away either as a hexafluorosilicic acid ($H_2SiF_6$) or as silicon tetrafluoride ($SiF_4$), thereby making it possible to obtain the porous carbon material. Also, after that, the rinsing and the drying have to be carried out.

On the other hand, when the porous carbon material precursor is treated by using the alkali (base), sodium hydroxide, for example, can be given as the alkali. When an aqueous solution of the alkali, pH of the aqueous solution has to be equal to or larger than 11. When the silicon compounds (for example, the silicon dioxide) contained in the porous carbon material precursor are removed away by using the sodium hydroxide aqueous solution, the silicon dioxide reacts with the sodium hydroxide as shown in Chemical Formula (C) by heating sodium hydroxide aqueous solution to be removed away as sodium silicate ($Na_2SiO_3$), thereby making it possible to obtain the porous carbon material. Also, when the porous carbon material precursor is treated to react with sodium hydroxide aqueous solution in a gas phase, the silicon dioxide reacts with the sodium hydroxide as shown in Chemical Formula (C) by heating a solid substance of sodium hydroxide to be removed away as sodium silicate ($Na_2SiO_3$), thereby making it possible to obtain the porous carbon material. Also, after that, the rinsing and the drying have to be carried out.

$$SiO_2 + 2NaOH \rightarrow Na_2SiO_3 + H_2O \quad (C)$$

Or, the porous carbon material, for example, disclosed in Japanese Patent Laid-Open No. 2010-106007 and including vacancies having three-dimensional regularity (the porous carbon material having a so-called inverted-opal structure) can also be used as the porous carbon material in the embodiment of the present invention. Specifically, the porous carbon material which includes the spherical vacancies having an average diameter of $1\times10^{-9}$ to $1\times10^{-5}$ m, and three-dimensionally disposed, and which has the specific surface area equal to or larger than $3\times10^2$ m$^2$/g, preferably, the porous carbon material in which macroscopically, the vacancies are arranged in a disposition state corresponding to a crystal structure, or macroscopically, the vacancies are arranged on the surface of the porous carbon material in a disposition state corresponding to (111) surface orientation in a face-centered cubic structure can also be used as the porous carbon material in the embodiment of the present invention.

Example 1

Example 1 relates to the fungicide of the embodiment of the present invention. The fungicide of Example 1 includes:

(A) a porous carbon material specifically, having a plant-derived material containing therein silicon as a raw material, more specifically, a porous carbon material having a plant-derived material containing therein silicon having a content rate of 5 wt % or more as a raw material, the content rate of silicon being equal to or smaller than 1 wt %; and (B) a silver member (silver material) adhered to the porous carbon material, in this case, a value of a specific surface area based on the nitrogen BET method is equal to or larger than 10 m$^2$/g, and a volume of a fine pore based on both the BJH method and the MP method is equal to or larger than 0.1 cm$^3$/g.

Or, the fungicide of Example 1 includes:
(A) a porous carbon material; and
(B) a silver member (silver material) adhered to the porous carbon material, and the value of the specific surface area based on the nitrogen BET method is equal to or larger than 10 m$^2$/g, and the total of the volumes of the fine pores having the diameters in the range of $1\times10^{-9}$ to $5\times10^{-7}$ m obtained based on the non localized density functional theory method is equal to or larger than 0.1 cm$^3$/g. Or, the value of the specific surface area based on the nitrogen BET method is equal to or larger than 10 m$^2$/g, and a rate of the total of the volumes of the fine pores having at least one peak in the range of 3 to 20 nm, and having the fine pore diameters in the range of 3 to 20 nm in the fine pore diameter distribution obtained based on the non localized density functional theory method is equal to or larger than 0.2 of the total of the volumes of all the fine pores.

In Example 1, a rice hull of rice (rice plant) was used as the plant-derived material as the raw material of the porous carbon material. Also, the rice hull as the raw material is carbonized to be transformed into a carbonaceous material (the porous carbon material precursor), and the resulting carbonaceous material is then subjected to an acid treatment, thereby obtaining the porous carbon material in Example 1. Also, after the porous carbon material is obtained in the manner as described above, a functional material (silver member) is adhered (supported, adsorbed or bonded) to the porous carbon material, thereby making it possible to obtain a porous carbon material complex (fungicide). Specifically, in Example 1, the silver member is composed of silver (silver of a metal), and is adhered in the form of a form and a shape of a fine particle to a surface (including an inside of the fine pore) of the porous carbon material. Hereinafter, a method of manufacturing the fungicide of Example 1 will be described.

[Process 100-A]

In the manufacture of the fungicide of Example 1, firstly, after the plant-derived material was carbonized at 400 to 1,400° C., the resulting material is treated by using either the acid or the alkali, thereby obtaining the porous carbon material. That is to say, firstly, the rice hull was subjected to the heating treatment (preliminary carbonizing treatment) in the inactive gas. Specifically, the rice hull was heated at 500° C. for 5 hours in the nitrogen gas-flow to be carbonized, thereby obtaining a carbide. It is noted that by carrying out such a treatment, the tar component which will be generated during the next carbonization can be either reduced or removed away. After that, 10 g of the carbide was put in a crucible made of alumina, and a temperature of 10 g of the carbide was made to rise to 800° C. at a rate of temperature rise of 5° C./minute in the nitrogen gas flow (5 l/minute). Also, after the carbide was carbonized at 800° C. for 1 hour to be transformed into the carbonaceous material (porous carbon material precursor), the resulting porous carbon material precursor was cooled to a room temperature. It is noted that during the carbonization and the cooling, the nitrogen gas was continuously flowed. Next, after the porous carbon material precursor was dipped in 46 vol % hydrofluoric acid aqueous solution through the night, thereby carrying out the acid treatment, the carbonaceous material was rinsed until pH 7 was obtained by using water and ethyl alcohol. It is noted that the porous carbon material thus obtained is referred to as "a porous carbon material-A" for the sake of convenience. Next, after the porous carbon material thus obtained was dried at 120° C., the porous carbon material was heated at 900° C. for 3 hours in a steam gas-flow to carry out an activation treatment, thereby making it possible to obtain the desired porous carbon material. It is noted that the porous carbon material thus obtained is referred to as "a porous carbon material-B" for the sake of convenience.

[Process-110A]

Next, a silver material was adhered (supported, adsorbed or bonded) to the resulting porous carbon material-B. It is noted that the treatment for adhering the functional material to the porous carbon material will be hereinafter referred to as "a compound treatment" in some cases. Specifically, 0.43 g of the porous carbon material-B was added to 182 ml of distilled water, and the stirring was carried out for 30 minutes. Also, after 8 ml of 5 mmol/l of a silver nitrate aqueous solution was added thereto, and the stirring was further carried out for 1 hour, 10 ml of 40 mmol/l of sodium boron hydride was added thereto, and the stirring was carried out through the night. After the resulting powder was filtered by using a filter and was then rinsed by using distilled water, the drying was carried out at 120° C., thereby obtaining the fungicide of Example 1-A.

[Process-110B]

Or, the silver member was adhered (supported, adsorbed or bonded) to the resulting porous carbon material-B by using a method different from that of the above case. Specifically, 0.215 g of porous carbon material-B was added to 1.33 mmol/l of 15 ml of a silver nitrate aqueous solution, and the stirring was carried out for 30 minutes. After that, after the heating was carried out at 100° C. and the boiling or the like was confirmed, 20 mmol/l of 5 ml of a trisodium acid citrate aqueous solution was dropped, and the reflux flow was carried out for 15 minutes. Also, after the resulting powder was filtered by using a filter and was then rinsed by using distilled water, the drying was carried out at 120° C., thereby obtaining the fungicide of Example 1-B.

In addition, the porous carbon material-B was used as Comparative Example 1 for various kinds of tests.

The element analysis about Example 1-A, Example 1-B, and Comparative Example 1 was carried out based on an energy dispersion method by using an energy dispersive X-ray analyzer. The analysis results are shown in Table 1.

TABLE 1

| Element | Example 1 Mass % | Example 1 At. % | Example 2 Mass % | Example 2 At. % | Comparative Example 1 Mass % | Comparative Example 1 At. % |
|---|---|---|---|---|---|---|
| C | 98.84 | 99.74 | 91.60 | 94.23 | 97.36 | 98.62 |
| N | — | — | 6.35 | 5.38 | — | — |
| O | — | — | — | — | 1.51 | 1.12 |
| F | 0.07 | 0.04 | — | — | — | — |
| Na | — | — | 0.01 | 0.01 | — | — |
| Mg | — | — | — | — | 0.01 | 0.01 |
| Al | — | — | — | — | — | — |
| Si | 0.17 | 0.07 | 0.10 | 0.04 | 0.19 | 0.08 |
| P | 0.01 | — | 0.02 | 0.01 | — | — |
| S | — | — | — | — | 0.03 | 0.01 |
| Cl | — | — | — | — | — | — |
| K | — | — | — | — | 0.02 | — |
| Ca | — | — | — | — | 0.05 | 0.01 |
| Sc | — | — | — | — | 0.05 | 0.01 |
| Ti | — | — | — | — | 0.03 | 0.01 |
| V | — | — | 0.04 | 0.01 | 0.06 | 0.02 |
| Cr | — | — | 0.02 | 0.01 | — | — |
| Mn | 0.04 | 0.01 | — | — | — | — |
| Fe | — | — | 0.04 | 0.01 | 0.03 | 0.01 |
| Co | — | — | — | — | 0.02 | — |
| Ni | 0.04 | 0.01 | 0.11 | 0.02 | 0.01 | — |
| Cu | — | — | 0.27 | 0.05 | 0.12 | 0.02 |
| Zn | 0.09 | 0.02 | 0.09 | 0.02 | 0.25 | 0.05 |
| Ga | 0.26 | 0.04 | 0.66 | 0.11 | — | — |
| Ge | 0.14 | 0.02 | 0.35 | 0.06 | 0.01 | — |
| As | 0.12 | 0.02 | 0.14 | 0.02 | 0.06 | 0.01 |
| Se | — | — | — | — | 0.08 | 0.01 |
| Br | — | — | — | — | 0.06 | 0.01 |
| Ag | 0.21 | 0.02 | 0.19 | 0.02 | 0.06 | 0.01 |
| Total | 100 | 100 | 100 | 100 | 100 | 100 |

Since the composition ratio of silver is increased in each of the fungicides of Example 1-A and Example 1-B, it is estimated that the silver member was adhered (supported, adsorbed or bonded) to the porous carbon material by carrying out the silver precipitating treatment either in [Process-110A] or in [Process-110B].

FIG. 1 shows electron microscope images of the fungicide of Example 1-A, Example 1-B, and the specimen of Comparative Example 1. A situation in which in each of the fungicides of Example 1-A and Example 1-B, the fine particles each having a particle size of about several tens of nanometer were precipitated was confirmed from these electron microscope images.

In addition, identification of the product, and an estimation of the particle size (refer to FIGS. 2A, 2B, 2C, and 2D) were carried out based on the X-ray diffraction analysis. Here, an X-ray diffraction system (RINT-TTRII) manufactured by RIGAKU CORPORATION was used, and a Cu-Kα ray was used as an X-ray source. It is noted that a wavelength is 0.15405 nm. In addition, an applied voltage was set as 50 kV, and a scanning step was set as 0.04°. Diffraction lines which appear in the standard data of Ag could be confirmed from each of the fungicides of Example 1-A and Example 1-B, and thus it was suggested from this confirmation that a complex of carbon and Ag was formed. In addition, it was found out that from a Scherrer's equation, the particle size of precipitated silver is about 40 nm in each of the fungicides of Example 1-A and Example 1-B.

BELSORP-mini (manufactured by BEL JAPAN INC.) was used as a measurement instrument for obtaining the value of the specific surface area, and the fine pore volume, and a test for adsorbing and desorbing nitrogen was carried out. With regard to the measurement condition, a measurement equilibrium relative pressure ($p/p_0$) was set in the range of 0.01 to 0.99. Also, the value of the specific surface area, and the fine pore volume was calculated based on the BELSORP analysis software. In addition, the test for adsorbing and desorbing nitrogen was carried out by using the measurement instrument described above, thereby calculating the fine pore diameter distribution of the meso fine pores and the micro fine pores based on both the BJH method and the MP method using the BELSORP analysis software. It is noted that in Example and Comparative Example as well which will be described later, the value of the specific surface area and the fine pore volume, and the fine pore diameter distribution of the meso fine pores and the micro fine pores were measured by using the same method as that in the above case. In addition, analysis software that comes with the automatic specific surface area/fine pore distribution measuring apparatus "BELSORP-MAX" manufactured by BEL JAPAN, INC. was used for the analysis based on the non localized density functional theory method. It is noted that for the measurement, drying was carried out at 200° C. for 3 hours as a pretreatment for a specimen.

With regard to the fungicides of Example 1-A and Example 1-B, and the specimen of Comparative Example 1 (porous carbon material-B), the value of the specific surface area, and the fine pore volume were measured, and as a result, the results shown in Table 2 were obtained. In addition, the fine pore diameter distribution of the meso fine pores and the micro fine pores was measured, and as a result, the results shown in FIGS. 3A and 3B were obtained. It is noted that in table 1, "specific surface area" and "entire fine pore volume" represent the specific surface area (unit: $m^2/g$) and the entire fine pore volume based on the nitrogen BET method, respectively, and "BJH(T)" and "MP(T)" represent the volume of the cumulative fine pore volume (unit: $m^2/g$) based on the BJH method, and the MP method, respectively. In addition, FIG. 4 shows the measurement results of the fine pore diameter distributions about Example 1-A, Example 1-B and Comparative Example 1 which are obtained by utilizing the non localized density functional theory method. In this case, the rate of the total of the volumes of the fine pores having the fine pore diameters in the range of 3 to 20 nm in the total volume of all the fine pores was as follows. It is noted that since the porous carbon material-B is prepared for Comparative Example 1, a large difference in rate of the total of the volumes of the fine pores between Example 1-A and Example 1-B, and Comparative Example 1 is not recognized so much.

Example 1-A: 0.435 (total of volumes of all fine pores: 1.381 cm$^3$/g)
Example 1-B: 0.538 (total of volumes of all fine pores: 1.293 cm$^3$/g)
Comparative Example 1: 0.435 (total of volumes of all fine pores: 1.533 cm$^3$/g)

TABLE 2

| [Example 1-A] |
|---|
| Specific surface area: 1,169<br>Fine pore volume: 1.04<br>BJT(T): 0.64<br>MP(T): 0.50 |
| [Example 1-B] |
| Specific surface area: 1,217<br>Fine pore volume: 1.08<br>BJT(T): 0.66<br>MP(T): 0.52 |
| [Comparative Example 1 (porous carbon material-B)] |
| Specific surface area: 1,300<br>Fine pore volume: 1.16<br>BJT(T): 0.76<br>MP(T): 0.48 |
| [Porous carbon material-A] |
| Specific surface area: 566<br>Fine pore volume: 0.60<br>BJT(T): 0.47<br>MP(T): 0.17 |

The value of the specific surface area and the entire fine pore volume, the fine pore volume are smaller in each of the fungicides of Example 1-A and Example 1-B for which the compounding treatment was carried out than in the specimen of Comparative Example 1 for which no compounding treatment was carried out. It is thought that this measurement result results from that by carrying out the compounding treatment, the fine pores of the porous carbon material were filled up by adhesion (precipitation) of the silver particles, or the weight was increased by adhesion (precipitation) of the silver particles.

Figure 3A:
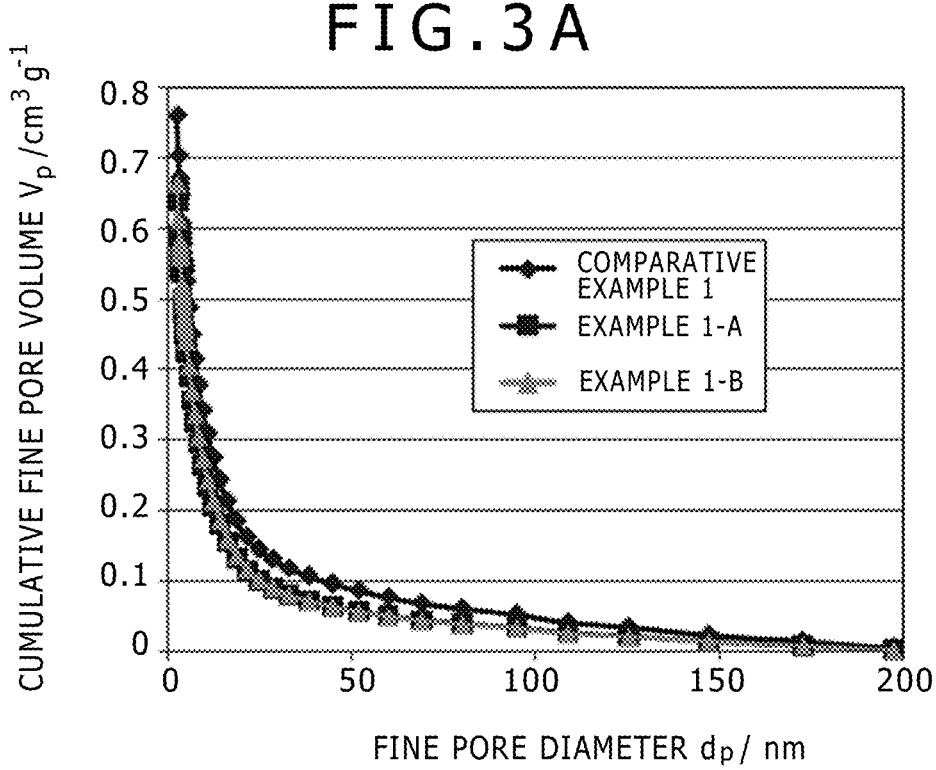
FIGS. 3A and 3B are graphs representing a fine pore distribution of meso fine pores, and a fine pore distribution of micro fine pores in the fungicides of Example 1-A and Example 1-B, and the specimen of Comparative Example 1, respectively.
Figure 3B:
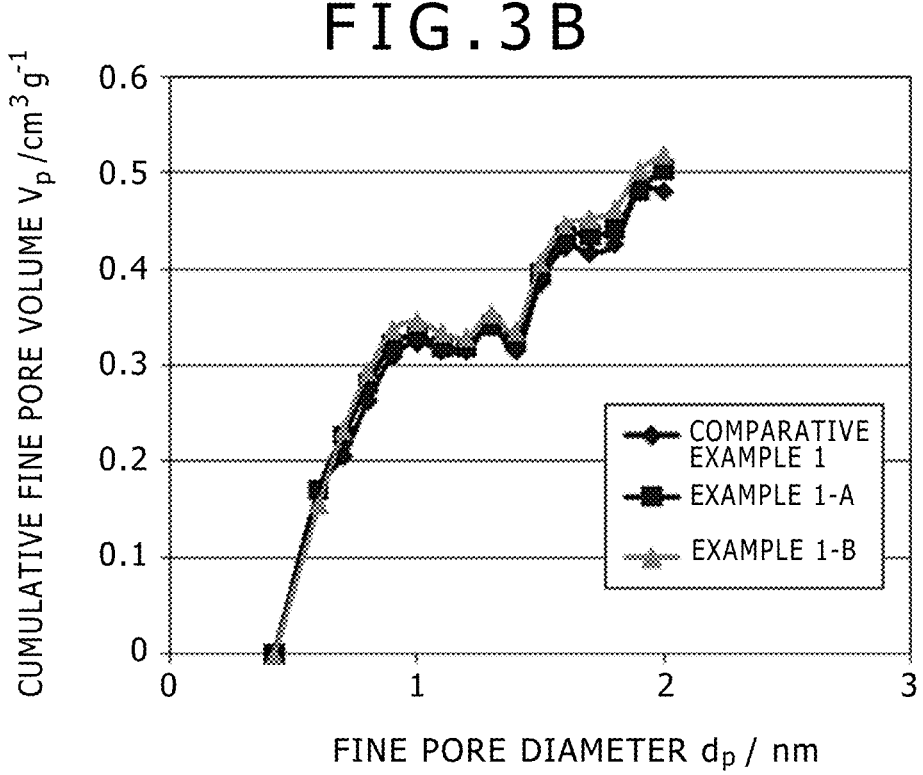
Figure 4:
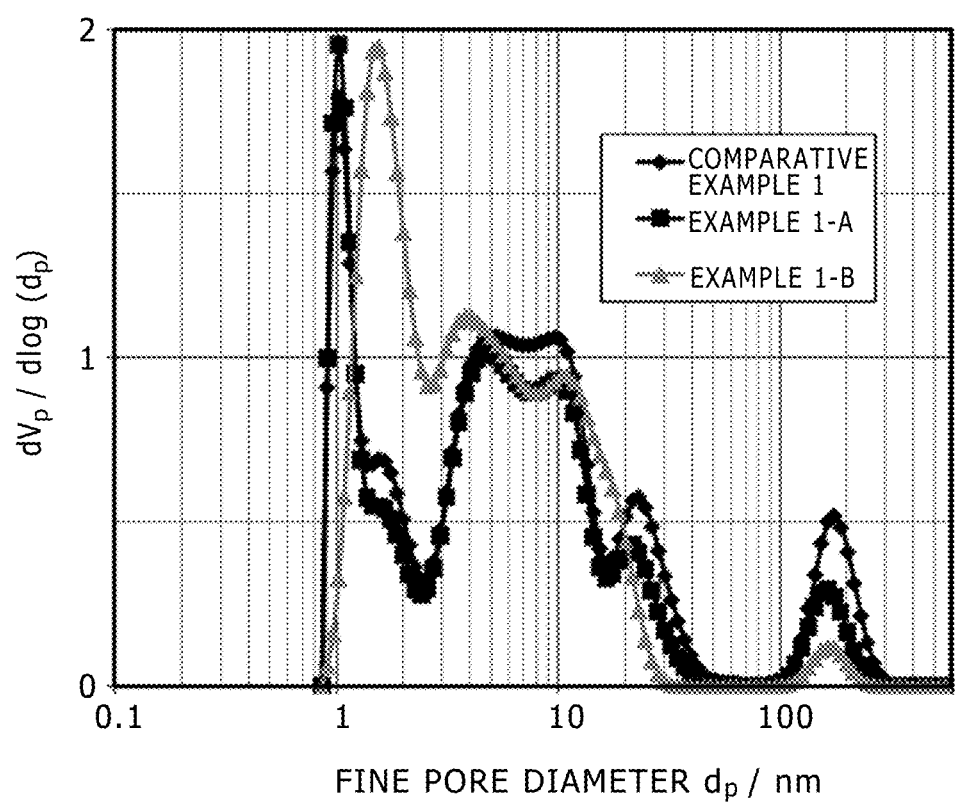
FIG. 4 is a graph representing measurement results of fine pore diameter distributions about Example 1-A, Example 1-B and Comparative Example 1 which are obtained by using a non localized density functional theory method.

From FIGS. 3A and 3B, the decrease in fine pore volume was totally recognized. In particular, in a region of the meso fine pores shown in FIG. 3A, the decrease in fine pore volume was remarkably confined in each of the fungicides of Example 1-A and Example 1-B as compared with the case of Comparative Example 1. This is thought to result from the precipitation of the functional material.

In addition, in each of the porous carbon material complexes of Example 1-A and Example 1-B, the content rate of silicon (Si) was remarkably decreased. As a result, it was suggested that the porous carbon material precursor is treated by using the acid to remove away the silicon components such as the silicon dioxide contained therein, which contributes to the increase in value of the specific surface area. In addition, it was confirmed that the number of meso fine pores and micro fine pores is increased by carrying out the treatment using the acid. This also applies to Example which will be described later. Also, the same results were obtained in the porous carbon material as well which was obtained by carrying out the treatment using the alkali (base) such as a sodium hydroxide aqueous solution instead of using a hydrofluoric acid aqueous solution.

In the fungicide of Example 1, the porous carbon material in which the value of the specific surface area based on the nitrogen BET method was equal to or larger than 10 m$^2$/g, the porous carbon material, specifically, the content rate of silicon was equal to or smaller than 1 wt %, and the volume of the fine pore based on both the BJH method and the MP method was equal to or larger than 0.1 cm$^3$/g was used, and the silver material was adhered to the porous carbon material concerned, whereby it was possible to increase the amount of silver material adhered per unit weight of the porous carbon material. Thus, it was possible to obtain the high odor eliminating capacity and the high sterilization effect. Here, the fungicide of Example 1 can also be utilized as a deodorant product, a deodorizer, an antimicrobial agent, or a preserving agent.

Example 2

Example 2 relates to a photo catalytic composite material of the embodiment of the present invention. The photo catalytic composite material of Example 2 (or, a depurative based on the photo catalytic composite material) includes:
(A) a porous carbon material, specifically, having a plant-derived material containing therein silicon as a raw material, more specifically, a porous carbon material having a plant-derived material containing therein silicon having a content rate of 5 wt % or more as a raw material, the content rate of silicon being equal to or smaller than 1 wt %; and
(B) a photo catalytic material adhered to the porous carbon material, in this case, a value of a specific surface area based on the nitrogen BET method is equal to or larger than 10 m$^2$/g, and a volume of a fine pore based on both the BJH method and the MP method is equal to or larger than 1 cm$^3$/g,
also, the photo catalytic material is composed of a titanium oxide doped either with a cation or with an anion.
Or, the photo catalytic composite material (or the depurative based on the photo catalytic composite material) of Example 2 includes:
(A) a porous carbon material; and
(B) a photo catalytic material adhered to the porous carbon material, and
the photo catalytic material is composed of a titanium oxide doped either with a cation or with an anion. Also, the value of the specific surface area based on the nitrogen BET method is equal to or larger than 10 m$^2$/g, and the total of the volumes of the fine pores having the diameters in the range of $1 \times 10^{-9}$ to $3 \times 10^{-7}$ m obtained by utilizing the non localized density functional theory method is equal to or larger than 0.1 m$^3$/g. Or, in the photo catalytic composite material (or the depurative based on the photo catalytic composite material) of Example 2, the value of the specific surface area based on the nitrogen BET method is equal to or larger than 10 m$^2$/g, and the rate of the total of the volumes of the fine pores having at least one peak in the range of 3 to 20 nm, and having the fine pore diameters in the range of 3 to 20 nm in the fine pore diameter distribution obtained by utilizing the non localized density functional theory method is equal to or larger than 0.2 of the total of the volumes of all the fine pores.

Figure 5:
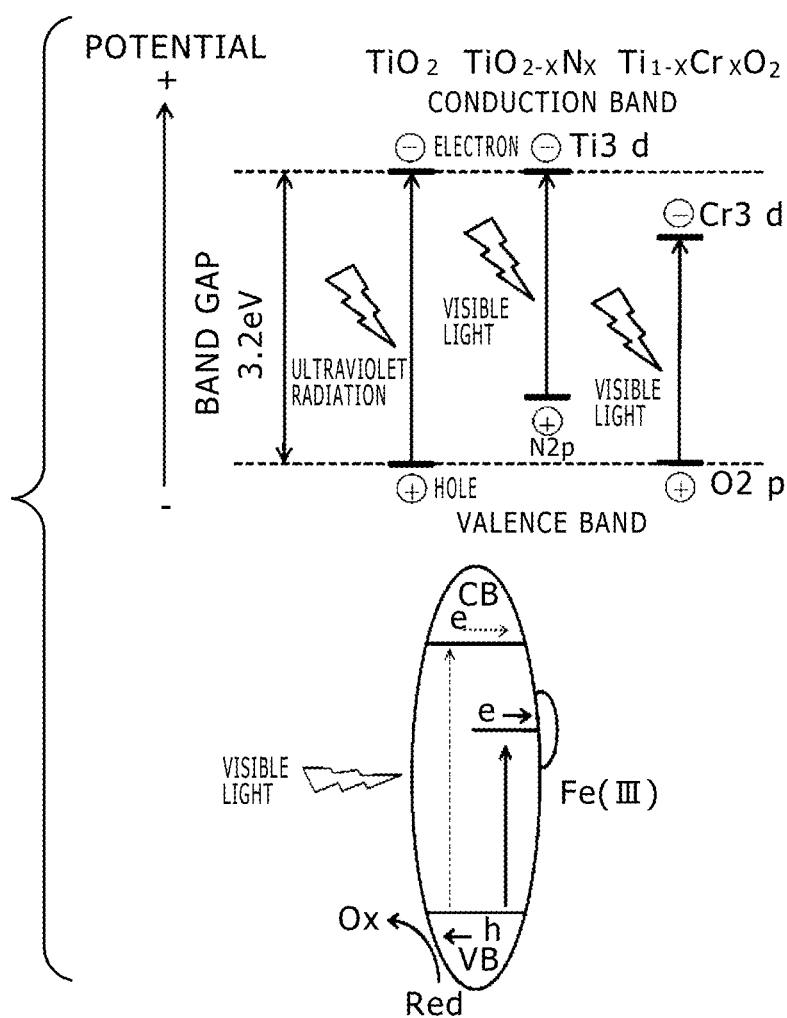
FIG. 5 is a view conceptually showing a state in which a photo catalytic material absorbs an energy of a light in a photo catalytic composite material of Example 2.
Figure 6:
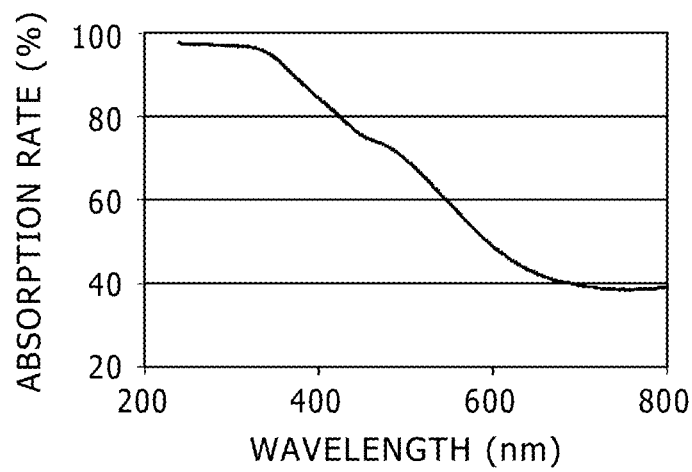
FIG. 6 is a graph representing light absorption characteristics of $TiO_2$.

Here, in Example 2, as has been described, the photo catalytic material (functional material) is composed of the titanium oxide ($TiO_2$) functioning as a photo catalyst. The titanium oxide is adhered (supported, adsorbed or bonded) to the porous carbon material. As a result, the porous carbon material complex is given a charge separation property, an ultraviolet ray absorption property, and a catalyst property. Thus, the photo catalytic composite material can be used as a harmful material decomposition agent, and a harmful material remover which can be semi-permanently used due to the photo catalytic effect. In addition, since the titanium oxide is doped either with the cation or with the anion, for example, the titanium oxide can adsorb an energy of a light having a wavelength of 200 to 600 nm, or an energy of a visible light. It is noted that a conceptual view of the adsorption of the energy is shown in FIG. 5. In addition, light absorption characteristics of the titanium oxide ($TiO_2$) are shown in FIG. 6.

Although in Example 2, the functional material composed of the titanium oxide doped either with the cation or with the anion was adhered (supported, adsorbed or bonded) to the porous carbon material-B descried above, concretely, the compounding treatment was carried out as follows.

That is to say, 0.5 g of the porous carbon material-B, 4.57 ml of an acetic acid, and a suitable amount of tetraisopropyl ortho-titanate (TIPO) were added to 100 ml of ethanol, and the stirring was carried out for 1 hour. After that, centrifugal separation was carried out, a supernatant liquid was discarded, a small amount of ethanol was added to a material in a solid phase and 100 ml of pure water was added by small and small while an ultrasonic wave was applied to the pure water. After that, the centrifugal separation was carried out again, and the resulting material in the solid phase was dried at 100° C. It is noted that the specimen obtained in this stage was used as a specimen of "Comparative Example 2." Next, crystal growth was carried out at 400° C. in an ammonia gas atmosphere to dope the titanium oxide with an anion composed of nitrogen, thereby making it possible to obtain the photo catalytic composite material (depurative) of Example 2-A.

Or, an aqueous solution was prepared in which 0.24 g of $FeCl_3.6H_2O$ was dissolved in 150 ml of pure water, and pH 2 was obtained by using a hydrochloric acid. Also, after the photo catalytic composite material thus obtained of Example 2-A was dispersed in the aqueous solution, and the stirring was carried out for 1 hour, the photo catalytic composite material was filtered by using a filter, and was rinsed in a distilled water. After that, the photo catalytic composite material was dried at 150° C., thereby making it possible to obtain a photo catalytic composite material (depurative) of Example 2-B. Note that, such a treatment is a treatment which is carried out for the purpose of doping the titanium oxide with an iron ion as the cation.

Figure 7:
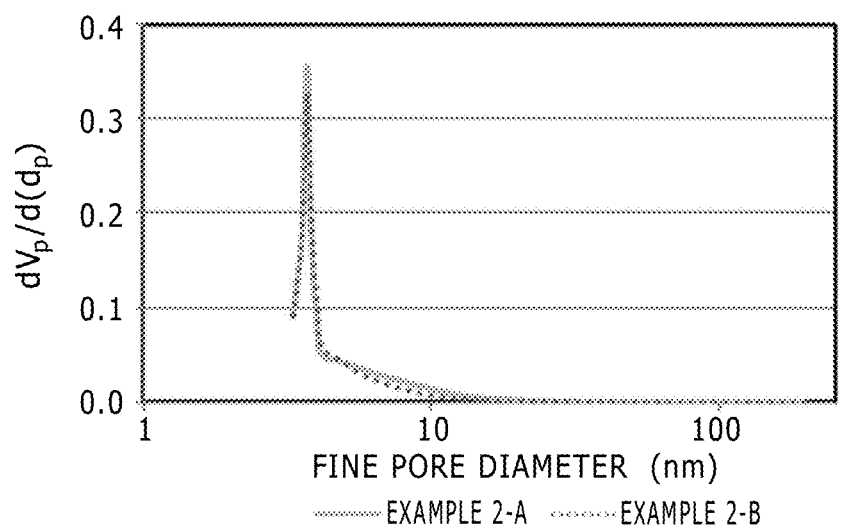
FIG. 7 is a graph representing results of a measurement of a fine pore (meso fine pore) distribution in specimens of Example 2-A and Example 2-B.
Figure 8:
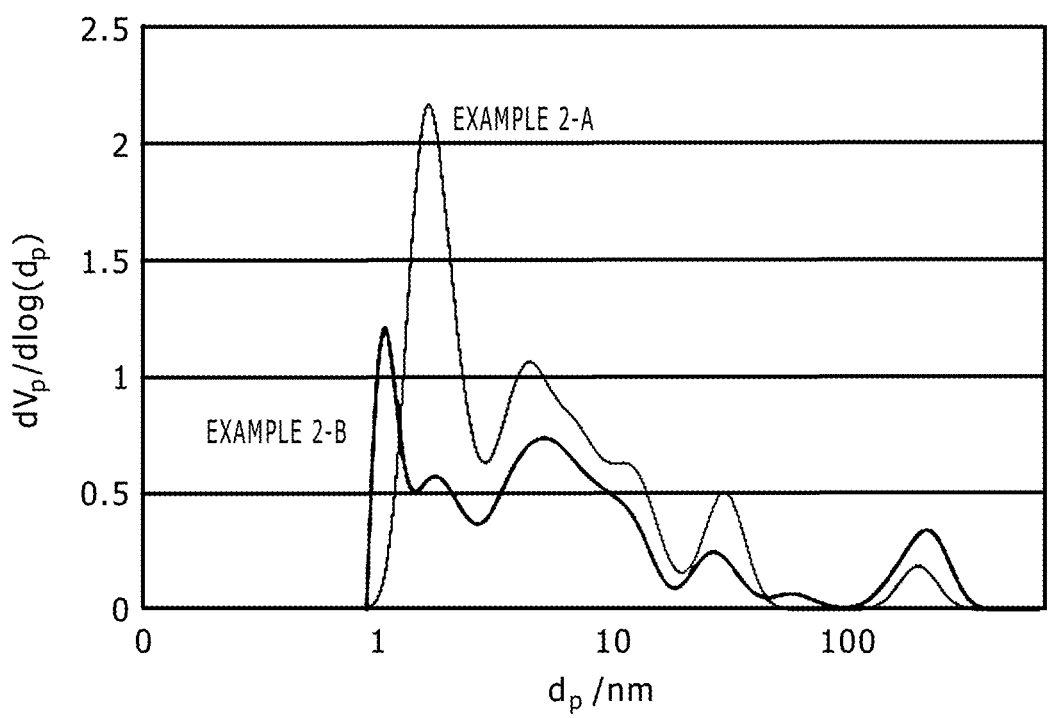
FIG. 8 is a graph representing measurement results of fine pore diameter distributions about Example 2-A and Example 2-B which are obtained by using the non localized density functional theory method.

It was possible to confirm that the titanium oxide ($TiO_2$) is contained in each of the specimens of Example 2-A and Example 2-B by carrying out the X-ray diffraction analysis (XRD). In addition, the specific surface area and the entire fine pore volume were measured based on the nitrogen BET method, the BJH method, and the MP method, and the measurement results are shown in Table 3. In addition, results of measurements of the fine porous (meso fine pores) are shown in FIG. 7. In addition, FIG. 8 shows the measurement results of the fine pore diameter distributions about Example 2-A and Example 2-B which are obtained by utilizing the non localized density functional theory method. In this case, the rate of the total of the volumes of the fine pores having the fine pore diameters in the range of 3 to 20 nm in the total volume of all the fine pores was as follows.

Example 2-A: 0.561
Example 2-B: 0.367

TABLE 3

| | Example 2-A | Example 2-B |
|---|---|---|
| Content rate of ($TiO_2$)(wt %) | 23.1 | 29.1 |
| Specific surface area ($m^2/g$) | 1,235 | 934 |
| Entire fine pore volume ($m^3/g$) | 0.9404 | 0.7088 |
| JBT(T) ($m^3/g$) | 0.5468 | 0.4254 |
| MP(T) ($m^3/g$) | 0.4993 | 0.4439 |
| NFDLT(T) ($m^3/g$) | 1.1354 | 0.9796 |

Figure 9:
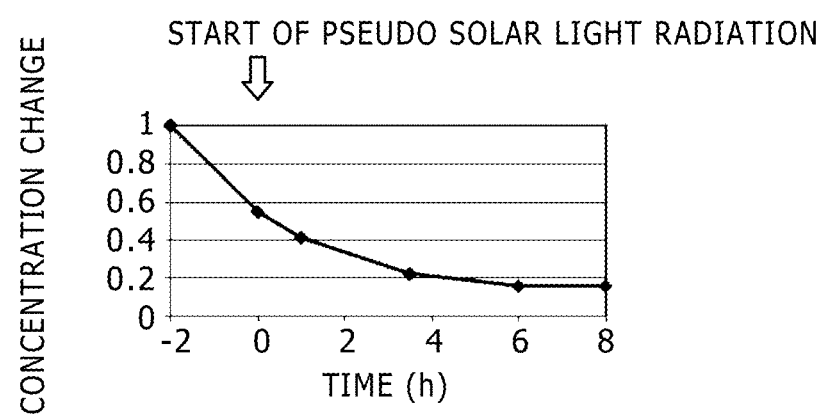
FIG. 9 is a graph representing a state in which each of the photo catalytic composite material of Example 2-A, and a specimen of Comparative Example 2 decomposes a tannic acid solution with time.

For the evaluation, 13 mg of the photo catalytic composite material of Example 2-A, and 13 mg of the specimen of Comparative Example 2 were each added to 50 ml of 0.08 mmol/l of a tannic acid aqueous solution. After a lapse of 24 hours, the pseudo solar light was radiated thereto. The radiation results are shown in FIG. 9. Thus, in the case of Example 2-A, it was possible to reliably decompose the tannic acid aqueous solution.

Figure 10:
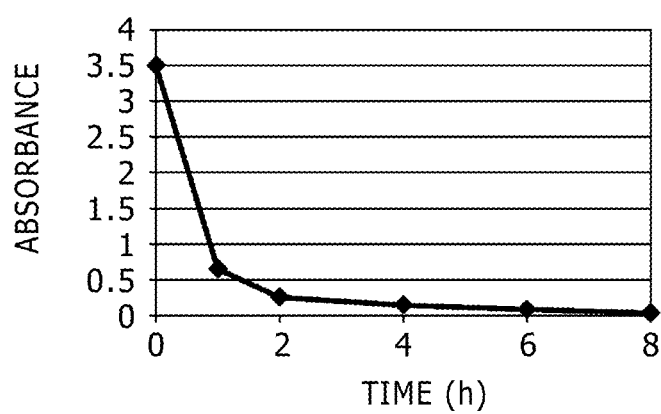
FIG. 10 is a graph representing a state in which each of the photo catalytic composite material of Example 2-B, and a specimen of Comparative Example 2 decomposes a methyl orange solution with time.

In addition, for the evaluation, 15 mg of the photo catalytic composite material of Example 2-B, and 15 mg of the specimen of Comparative Example 2 were each added to 50 ml of 0.15 mml/l of a methyl orange aqueous solution, and the pseudo solar light was radiated thereto. The radiation results are shown in FIG. 10. Thus, in the case of Example 2-B, it was possible to confirm that after a lapse of 8 hours from start of the radiation of the pseudo solar light, almost methyl orange was decomposed.

Figures 11A, 11B, 12:
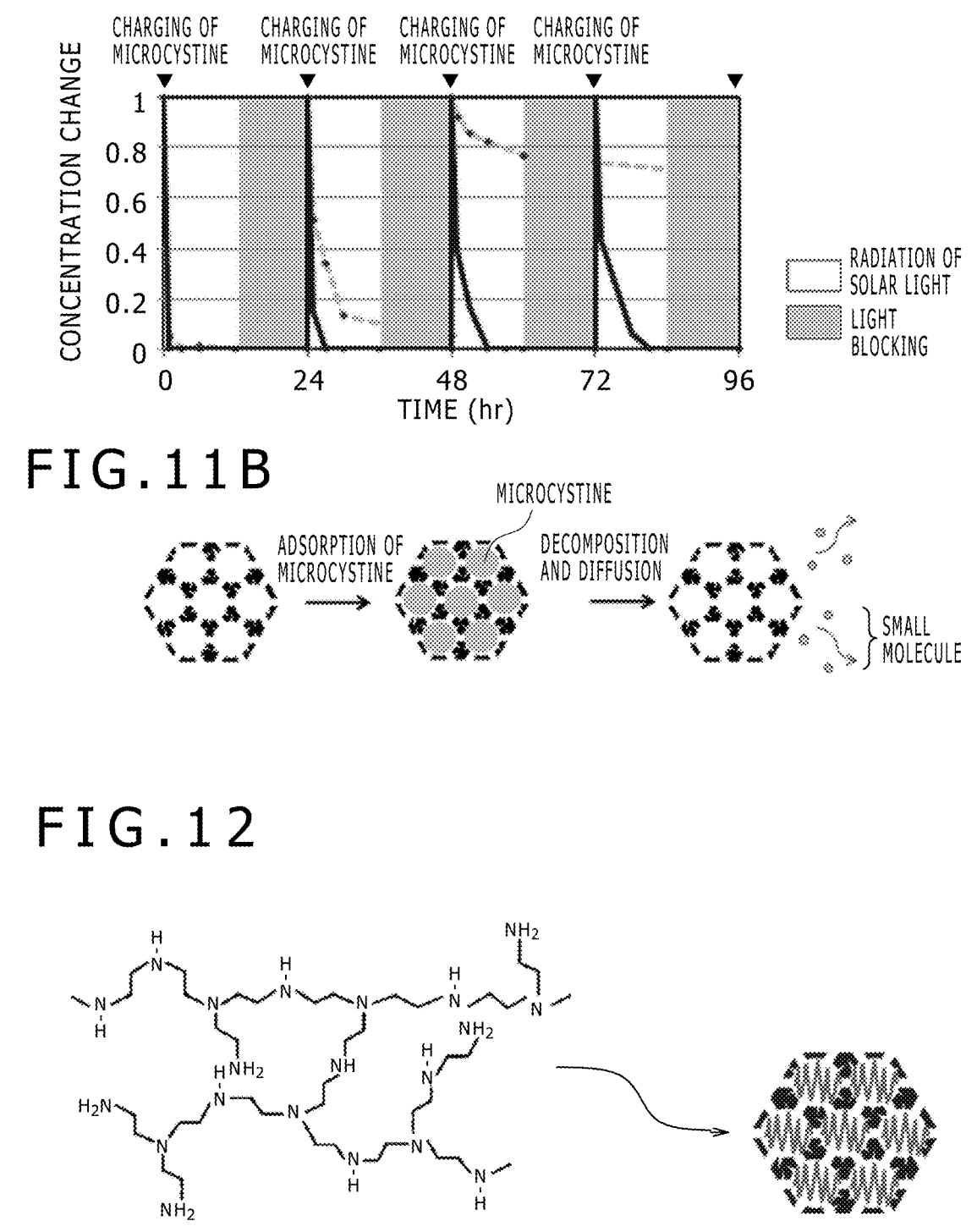

In addition, an experiment was carried out such that 1.5 mg of the specimen (optical catalytic composite material) of Exam 2-B, and 1.5 mg of a porous carbon material-B (Comparative Example 2') were each added to 5 ml of water, 100 μg of micro-cystine was charged thereto every 24 hours, and the radiation and blocking of the pseudo solar light were repetitively carried out every 12 hours. The experimental results are shown in FIG. 11A. In the case of the porous carbon material-B (Comparative Example 2'), micro-cystine was not approximately absorbed at the third round of charging, whereas in the case of the specimen of Example 2-B, a sharp adsorption was observed many times. From the experiment results, it was possible to confirm that in the specimen of Example 2-B, micro-cystine is taken in the meso fine pores, and is thereafter decomposed by the radiation of the pseudo solar light. This is shown in a conceptual view of FIG. 11B. Note that, in FIG. 11B, a sawtooth waveform indicated by a solid line shows the results of the experiment about the specimen of Example 2-B, and a waveform indicated by a dotted line shows the results of the experiment about the specimen of Comparative Example 2'.

The porous carbon material in Example 2 is more specifically, the natural product-derived environment conciliatory material, and the fine structure thereof is obtained by treating the silicon components (silicon oxides) previously contained in the raw material as the plant-derived material by using either the acid or alkali to remove away the silicon components. Therefore, the fine pore has the size and the meso region (in the range of 2 to 50 nm) which cannot be realized in the existing activated carbon. In addition, the arrangement of the fine pores maintains the biological body regularity which the plant has. In the optical catalytic composite material of Example 2, by such a fine pore size and arrangement, the photo catalytic material can be very effectively adhered to the porous carbon material, and thus the decomposition based on the photo catalytic action can be effectively caused. In addition, it is thought that even in the depurative based on the photo catalytic composite material of Example 2 as the environment purifying material, such a fine pore size and arrangement effectively acts on the adsorption of the harmful materials. At the same time, the photo catalytic material can be very effectively adhered to the porous carbon material, and thus the decomposition and the detoxification in the photo catalytic action can be effectively caused. In addition, the diffusion of the harmful materials in the inside of the depurative is promoted, and thus the decomposition based on the optical catalytic action can be more effectively caused, and thus the purification of the water and the purification of the air can be very effectively carried out. In addition, since the photo catalytic composite material of Example 2 can absorb the energy of the visible light, it is possible to provide the photo catalytic composite material showing the superior decomposition reaction.

Example 3

Example 3 relates to an adsorbent and a depurative of the embodiment of the present invention. The adsorbent and the depurative of Example 3 include:

(A) a photo catalytic composite material, specifically, a porous carbon material having a plant-derived material containing therein silicon as a raw material, more specifically, a porous carbon material having a plant-derived material containing therein silicon having a content rate of 5 wt % or more as a raw material, the content rate of silicon being equal to or smaller than 1 wt %; and (B) an organic material adhered to the porous carbon material, in this case, a value of a specific surface area based on a nitrogen BET method is equal to or larger than 10 $m^2/g$, and a volume of a fine pore based on both the BJH method and the MP method is equal to or larger than 0.1 $cm^3/g$, also, the organic material adsorbs a metal.

Or, the adsorbent or the depurative of Example 3 includes:
(A) a porous carbon material; and
(B) a photo catalytic material adhered to the porous carbon material, and an organic material adsorbs a metal. Also, the value of the specific surface area based on the nitrogen BET method is equal to or larger than 10 $m^2/g$, and the total of the volumes of the fine pores having the diameters in the range of $1 \times 10^{-9}$ to $3 \times 10^{-7}$ m obtained by utilizing the non localized density functional theory method is equal to or larger than 0.1 $cm^3/g$.

Or, in the adsorbent or the depurative of Example 3, the value of the specific surface area based on the nitrogen BET method is equal to or larger than 10 $m^2/g$, and the rate of the total of the volumes of the fine pores having at least one peak in the range of 3 to 20 nm, and having the fine pore diameters in the range of 3 to 20 nm in the fine pore diameter distribution obtained by utilizing the non localized density functional theory method is equal to or larger than 0.2 of the total of the volumes of all the fine pores.

Figure 13:
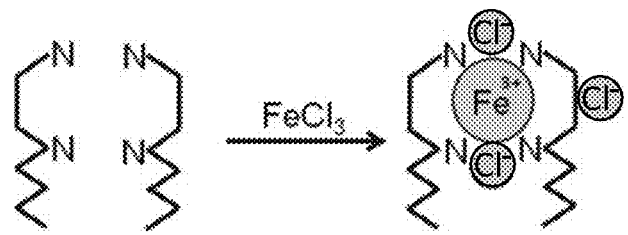
FIG. 13 is a view schematically showing a state in which the adsorbent and the depurative of Example 3, an ion exchange capacity can be enhanced by carrying out a treatment by using $FeCl_3 \cdot 6H_2O$.

In Example 3 polyethylene imine was used as the organic material. A state in which polyethylene imine is adhered (supported, adsorbed or bonded) to the porous carbon material is schematically shown in FIG. 12. In addition, a chromium (Cr) ion was adsorbed as the metal. In the adsorbent and the depurative of Example 3, 0.3 g of the porous carbon material-B described above, and 1.5 g of polyethylene imine were dispersed in 100 ml of pure water, and the stirring was carried out for 1 hour, thereby adhering (supporting, adsorbing or bonding) polyethylene imine to the fine pores in the meso region of the porous carbon material-B. After that, the material in a solid phase which was obtained through the filtering was charged in an aqueous solution in which 0.5 g of $FeCl_3 \cdot 6H_2O$ was dissolved in 100 ml of pure water, and the stirring was carried out for 1 hour. Also, after resulting powder was filtered by using a filter, and was then rinsed by using distilled water, the drying was carried out at 120° C., thereby obtaining the adsorbent and the depurative of Example 3. It is noted that the treatment using $FeCl_3 \cdot 6H_2O$ is carried out in such a manner, thereby making it possible to enhance the ion exchange capacity. This state is schematically shown in FIG. 13.

Figure 14:
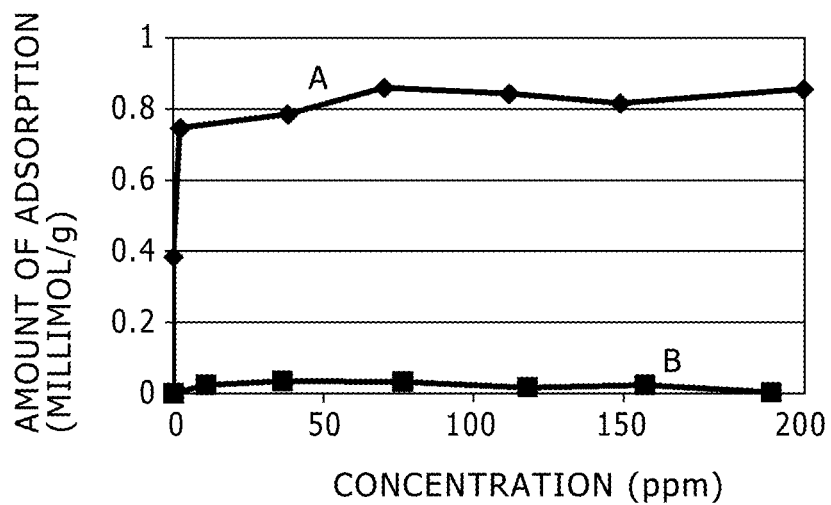
FIG. 14 is a graph representing a state in which the adsorbent and the depurative of Examples 3 and activated carbon of Comparative Example 3 adsorb potassium chromate.
Figure 15:
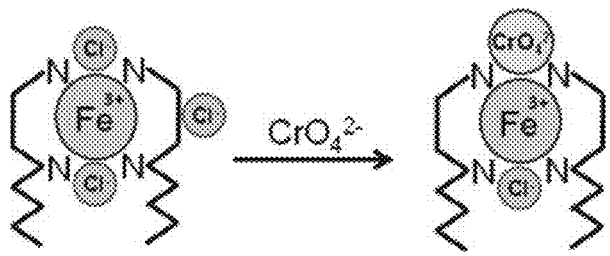
FIG. 15 is a view schematically showing a state in which the adsorbent and the depurative of Examples 3 adsorb a chromate ion.
Figure 16:
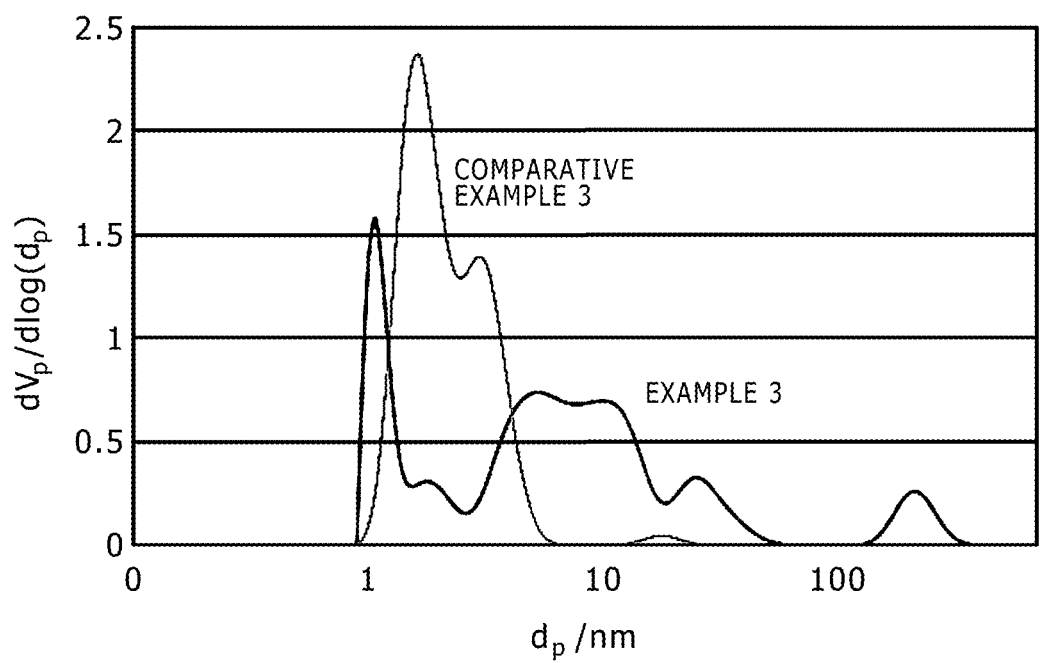
FIG. 16 is a graph representing measurement results of fine pore diameter distributions about Example 3 and Comparative Example 3 which are obtained by using the non localized density functional theory method.

After 10 mg of the specimen of Example 3, and 10 mg of commercially available activated carbon (Comparative Example 3) were dispersed in 5 ml of each of various concentrations of potassium chromate, and the stirring was carried out for 1 hour, the absorbance was measured. The measurement results are shown in FIG. 14. It was possible to confirm that the adsorbent and the depurative of Example 3 (indicated by "A" in FIG. 14) have the adsorptive performance which is 20 times as large as that of the commercially available activated carbon (indicated by "B" in FIG. 14). That is to say, the adsorbent and the depurative of Example 3 can effectively adsorb the metal (such as the metal atom or the metal ion) because the organic material is adhered (supported, adsorbed or bonded) to the porous carbon material. It is noted that a state in which the adsorbent and the depurative of Example 3 adsorb a potassium chromate ion is schematically shown in FIG. 15. In addition, the specific surface area and the entire fine pore volume were measured based on the nitrogen BET method, the BJH method and the MP method, and the measurement results are shown in Table 4. In addition, FIG. 16 shows the measurement results of the fine pore diameter distributions about Example 3 and Comparative Example 3 which are obtained by utilizing the non localized density functional theory method. In this case, the rate of the total of the volumes of the fine pores having the fine pore diameters in the range of 3 to 20 nm in the total volume of all the fine pores was as follows.

Example 3: 0.415
Comparative Example 3: 0.134

TABLE 4

| | Examples 3 | Comparative Example 3 |
|---|---|---|
| Specific surface area ($m^2/g$) | 957 | 1,184 |
| Entire fine pore volume ($m^3/g$) | 0.7817 | 0.05731 |
| JBT(T) ($m^3/g$) | 0.4948 | 0.0816 |
| MP(T) ($m^3/g$) | 0.3743 | 0.5702 |
| NFDLT(T) ($m^3/g$) | 1.0511 | 0.7557 |

Although the present invention has been described so far based on Examples, the present invention is by no means limited thereto, and various kinds of changes can be made. Although in each of Examples 1 to 4, the description has been given with respect to the case where the rice hull is used as the raw material of the porous carbon material, any other suitable plant may also be used as the raw material. Here, a straw, a reed, or a stalk brown seaweed (kukiwakame), a vascular plant, a pteridophyte or a bryophyte which is vegetated on the land, an alga or a sea alga can be given as any other suitable plant. These materials may be used either in the form of singularity or in the form of multiple kinds of materials mixed with one another.

Specifically, for example, a straw of a rice plant (for example, Isehikari from Kagoshima Prefecture) is used as the plant-derived material as the raw material of the porous carbon material. Also, the straw as the raw material is carbonized to be transformed into the carbonaceous material (porous carbon material precursor), and the resulting porous carbon material precursor is then subjected to the acid treatment, thereby making it possible to obtain the porous carbon material. Or, the graminaceous reed is used as the plant-derived material as the raw material of the porous carbon material, and graminaceous reed as the raw material is carbonized to be transformed into the carbonaceous material (porous carbon material precursor). Next, the resulting porous carbon material precursor is subjected to the acid treatment, thereby making it possible to obtain the porous carbon material. In addition, the same results were obtained even in the porous carbon material which was obtained in the treatment using an alkali (base) such as a sodium hydrate liquid solution instead of using a hydrofluoric acid liquid solution. It should be noted that a method of manufacturing the porous carbon material complex can be made same to that in each of Example 1 to Example 3.

Or, the stalk brown seaweed (kukiwakame) (from Sanriku in Iwate Prefecture) is used as the plant-derived material as the raw material of the porous carbon material, and the stalk brown seaweed (kukiwakame) as the raw material is carbonized to be transformed into the carbonaceous material (porous carbon material precursor). Next, the resulting porous carbon material precursor is subjected to the acid treatment, thereby making it possible to obtain the porous carbon material. Specifically, firstly, for example, the stalk brown seaweed (kukiwakame) is heated at a temperature of about 500° C. to be carbonized. It is noted that before the heating, for example, the stalk brown seaweed (kukiwakame) as the raw material may be treated by using alcohol. A method of dipping the stalk brown seaweed (kukiwakame) as the raw material in ethyl alcohol or the like is given as the concrete treatment method. As a result, it is possible to reduce water contained in the raw material, and it is also possible to elute elements other than carbon, and the mineral components which are all contained in the porous carbon material finally obtained. In addition, by carrying out the treatment using alcohol, it is possible to suppress the generation of gas in a phase of the carbonization. More specifically, the stalk brown seaweed (kukiwakame) is dipped in ethyl alcohol for 48 hours. It is noted that an ultrasonic treatment is preferably carried out in ethyl alcohol. Next, the stalk brown seaweed (kukiwakame) is heated at 500° C. for 5 hours in a nitrogen gas-flow to be carbonized, thereby obtaining the carbide. It is noted that by carrying out such a treatment (preliminary carbonization treatment), the tar component which will be generated during the next carbonization can be either reduced or removed away. After that, 10 g of the carbide is put in a crucible made of alumina, and a temperature of 10 g of the carbide is made to rise to 1,000° C. at a rate of temperature rise of 5° C./minute in the nitrogen gas-flow (10 l/minute). Also, after the carbide is carbonized at 1,000° C. for 5 hour to be transformed into the carbonaceous material (porous carbon material precursor), the resulting porous carbon material precursor is cooled to a room temperature. It is noted that during the carbonization and the cooling, the nitrogen gas is continuously flowed. Next, after the porous carbon material precursor is dipped in 46 vol % hydrofluoric acid aqueous solution through the night, thereby carrying out the acid treatment, the porous carbon material is rinsed until pH 7 is obtained by using water and ethyl alcohol. Also, finally, the drying is carried out, thereby making it possible to obtain the porous carbon material. After that, the compounding treatment and the activation treatment which were described in each of Example 1 to Example 3 have to be carried out.

The present application contains subject matter related to that disclosed in Japanese Priority Patent Application JP 2011-009456 filed with the Japan Patent Office on Jan. 20, 2011, the entire content of which is hereby incorporated by reference.

What is claimed is:

1. A photo catalytic composite material, comprising:
a porous carbon material that includes one of:
  magnesium with a content rate more than 0.01 wt % and less than 3 wt %,
  potassium with a content rate more than 0.01 wt % and less than 3 wt %,
  calcium with a content rate more than 0.05 wt % and less than 3 wt %,
  phosphorus with a content rate more than 0.01 wt % and less than 3 wt %, or
  sulfur with a content rate more than 0.01 wt % and less than 3 wt %; and
a photo catalytic material adhered to the porous carbon material, wherein
  the photo catalytic material comprises a metal oxide doped with one of an iron ion, a copper ion, or a tungsten ion,
  a value of a specific surface area based at least in part on a nitrogen Brunauer, Emmett, and Teller (BET) method is greater than or equal to 10 $m^2/g$, and
  a volume of a fine pore based at least in part on a Barrett, Joyner, and Halenda (BJH) method and a Micro Pore (MP) method is greater than or equal to 0.1 cm3/g.

2. The photo catalytic composite material according to claim 1, wherein the photo catalytic material is configured to absorb an energy of a light having a wavelength between 200 nm to 600 nm.

3. The photo catalytic composite material according to claim 1, wherein the metal oxide is further doped with one of a cation or an anion.

4. The photo catalytic composite material according to claim 3, wherein
  the cation includes at least one of a chromium ion, a silver ion, a platinum ion, a cobalt ion, or a nickel ion, and
  the anion includes at least one of a nitrogen ion, a carbon ion, or a sulfur ion.

5. The photo catalytic composite material according to claim 1, wherein the porous carbon material lacks silicon oxide.

6. The photo catalytic composite material according to claim 1, wherein the porous carbon material has a distribution of fine pores with a peak in a range of 3 nm to 20 nm.

7. The photo catalytic composite material according to claim 1, wherein the porous carbon material includes silicon.

8. A depurative, comprising:
a porous carbon material that includes one of:
  magnesium with a content rate more than 0.01 wt % and less than 3 wt %,
  potassium with a content rate more than 0.01 wt % and less than 3 wt %,
  calcium with a content rate more than 0.05 wt % and less than 3 wt %,
  phosphorus with a content rate more than 0.01 wt % and less than 3 wt %, or
  sulfur with a content rate more than 0.01 wt % and less than 3 wt %; and a photo catalytic material adhered to the porous carbon material, wherein
the photo catalytic material comprises a metal oxide doped with one of an iron ion, a copper ion, or a tungsten ion,
a value of a specific surface area based at least in part on a nitrogen Brunauer, Emmett, and Teller (BET) method is greater than or equal to 10 $m^2/g$,
a volume of a fine pore based at least in part on a Barrett, Joyner, and Halenda (BJH) method and a Micro Pore (MP) method is greater than or equal to 0.1 $cm^3/g$, and
the depurative is based on the photo catalytic material.

9. A depurative, comprising: a porous carbon material; and an organic material adhered to said porous carbon material, wherein a value of a specific surface area based on a nitrogen BET method is equal to or greater than 10 $m^2/g$, and a volume of a fine pore based on a BJH method and an MP method is equal to or greater than 0.1 $cm^3/g$.

10. The depurative according to claim 9, wherein said organic material is an organic material having at least one group selected from the group consisting of a phenol group, a carboxyl group, an amino group, a thiol group, a ketone group, and a phosphoric acid group.

11. The depurative according to claim 9, wherein the organic material adsorbs a metal.

12. The depurative according to claim 11, wherein said metal is selected from the group consisting of chromium, mercury, arsenic, lead, cadmium, tin, copper, zinc, lithium, beryllium, boron, titanium, vanadium, manganese, cobalt, nickel, gallium, germanium, selenium, rubidium, strontium, zirconium, niobium, molybdenum, palladium, indium, antimony, tellurium, cesium, barium, hafnium, tantalum, tungsten, rhenium, platinum, thallium, bismuth, scandium, yttrium, lanthanum, cerium, praseodymium, neodymium, promethium, samarium, europium, gadolinium, terbium, dysprosium, holmium, erbium, thulium, ytterbium, and lutetium.

13. The depurative according to claim 9, wherein silicon oxide is removed away from the porous carbon material.

14. The photo catalytic composite material according to claim 1, wherein
the metal oxide is one of a titanium oxide or a zinc oxide, and
the metal oxide is adhered to the porous carbon material as a thin layer.

* * * * *